(12) United States Patent
Woleader et al.

(10) Patent No.: US 10,458,454 B2
(45) Date of Patent: Oct. 29, 2019

(54) STRUCTURAL ASSEMBLY HAVING INJECTION-BONDED JOINT AND METHOD OF FORMING

(71) Applicant: The Boeing Company, Chicago, IL (US)

(72) Inventors: John A. Woleader, Pomona, CA (US); Andrew R. Streett, San Clemente, CA (US)

(73) Assignee: The Boeing Company, Chicago, IL (US)

( * ) Notice: Subject to any disclaimer, the term of this patent is extended or adjusted under 35 U.S.C. 154(b) by 311 days.

(21) Appl. No.: 15/382,640

(22) Filed: Dec. 17, 2016

(65) Prior Publication Data
US 2017/0097031 A1    Apr. 6, 2017

Related U.S. Application Data

(62) Division of application No. 13/774,246, filed on Feb. 22, 2013, now Pat. No. 9,555,608.

(51) Int. Cl.
*F16B 11/00* (2006.01)
*B32B 37/12* (2006.01)
(Continued)

(52) U.S. Cl.
CPC .......... *F16B 11/006* (2013.01); *B29C 65/542* (2013.01); *B29C 66/12441* (2013.01);
(Continued)

(58) Field of Classification Search
CPC ..... B29C 65/524; B29C 65/54; B29C 65/542; B64G 1/002; B64G 1/14; B64C 1/069
See application file for complete search history.

(56) References Cited

U.S. PATENT DOCUMENTS 3,847,694 A * 11/1974 Stewing ................. B29C 61/00
156/86
7,645,406 B2    1/2010 Kilwin
(Continued)

FOREIGN PATENT DOCUMENTS

| EP | 2227108 | 9/2010 |
|---|---|---|
| FR | 2681003 | 3/1993 |

(Continued)

OTHER PUBLICATIONS

Russian Patent Office, Examination Report, Application No. 2015127436/12(042630), dated Oct. 5, 2017.
PCT/US2014/014701, International Search Report dated May 8, 2014.
Australian Patent Office, Examination Report, Application No. 2014219398, dated Feb. 3, 2017.

*Primary Examiner* — Michael P Ferguson

(57) ABSTRACT

A method of forming an injection-bonded joint includes providing a first part and a second part having a second part upper edge and a second part lower edge, and forming a chamber wall within a bondline region between mating surfaces of the first part and the second part. The chamber wall divides a bondline length of the bondline region and defines at least one adhesive chamber. The method further includes forming a bondline dam along each of the second part upper edge and the second part lower edge in a manner such that the chamber wall, the bondline dams, and the mating surfaces collectively enclose the adhesive chamber having a chamber upper edge and a chamber lower edge. The method also includes injecting a structural adhesive into the adhesive chamber through an injection port and discharging excess adhesive from the adhesive chamber through a bleed hole.

16 Claims, 23 Drawing Sheets

(51) Int. Cl.
  *B29C 65/54* (2006.01)
  *B29C 65/00* (2006.01)
  *B29L 31/30* (2006.01)
  *B29C 37/04* (2006.01)

(52) U.S. Cl.
  CPC ........ *B29C 66/342* (2013.01); *B29C 66/3452* (2013.01); *B29C 66/5344* (2013.01); *B29C 66/53241* (2013.01); *B29C 66/55* (2013.01); *B32B 37/1284* (2013.01); *B29C 37/04* (2013.01); *B29C 66/004* (2013.01); *B29C 66/1122* (2013.01); *B29C 66/32* (2013.01); *B29C 66/721* (2013.01); *B29C 66/742* (2013.01); *B29C 66/861* (2013.01); *B29L 2031/3097* (2013.01); *Y10T 403/477* (2015.01)

(56) References Cited

U.S. PATENT DOCUMENTS

| | | |
|---|---|---|
| 7,914,223 B2 | 3/2011 | Wood |
| 2006/0243382 A1 | 11/2006 | Kilwin et al. |
| 2012/0024457 A1 | 2/2012 | Ramm et al. |

FOREIGN PATENT DOCUMENTS

| | | | | |
|---|---|---|---|---|
| GB | 966772 | 8/1964 | | |
| WO | WO9316872 | 9/1993 | | |
| WO | WO9721953 | 6/1997 | | |
| WO | WO 00/19112 | * 4/2000 | ............. | B29C 65/54 |

\* cited by examiner

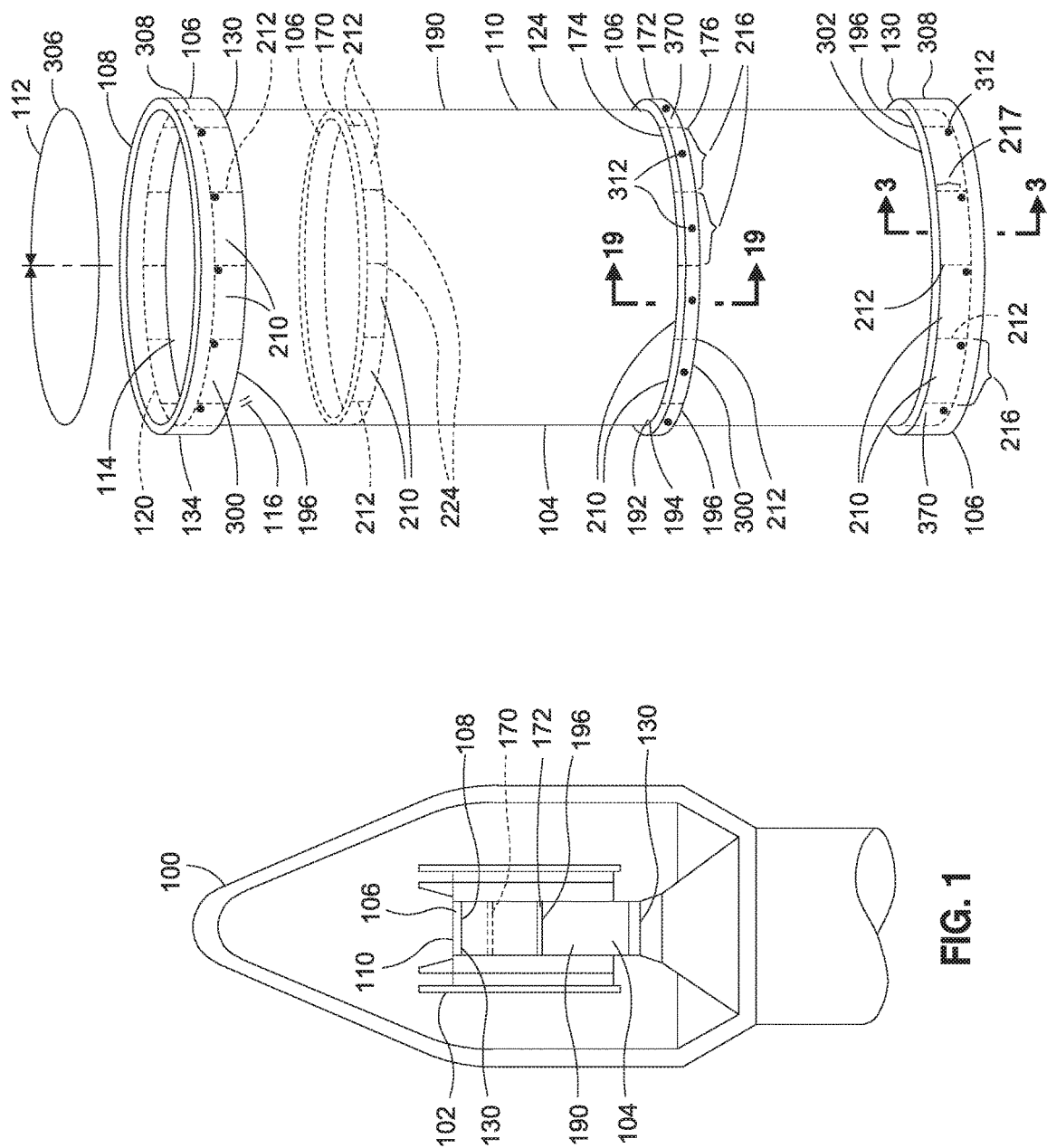

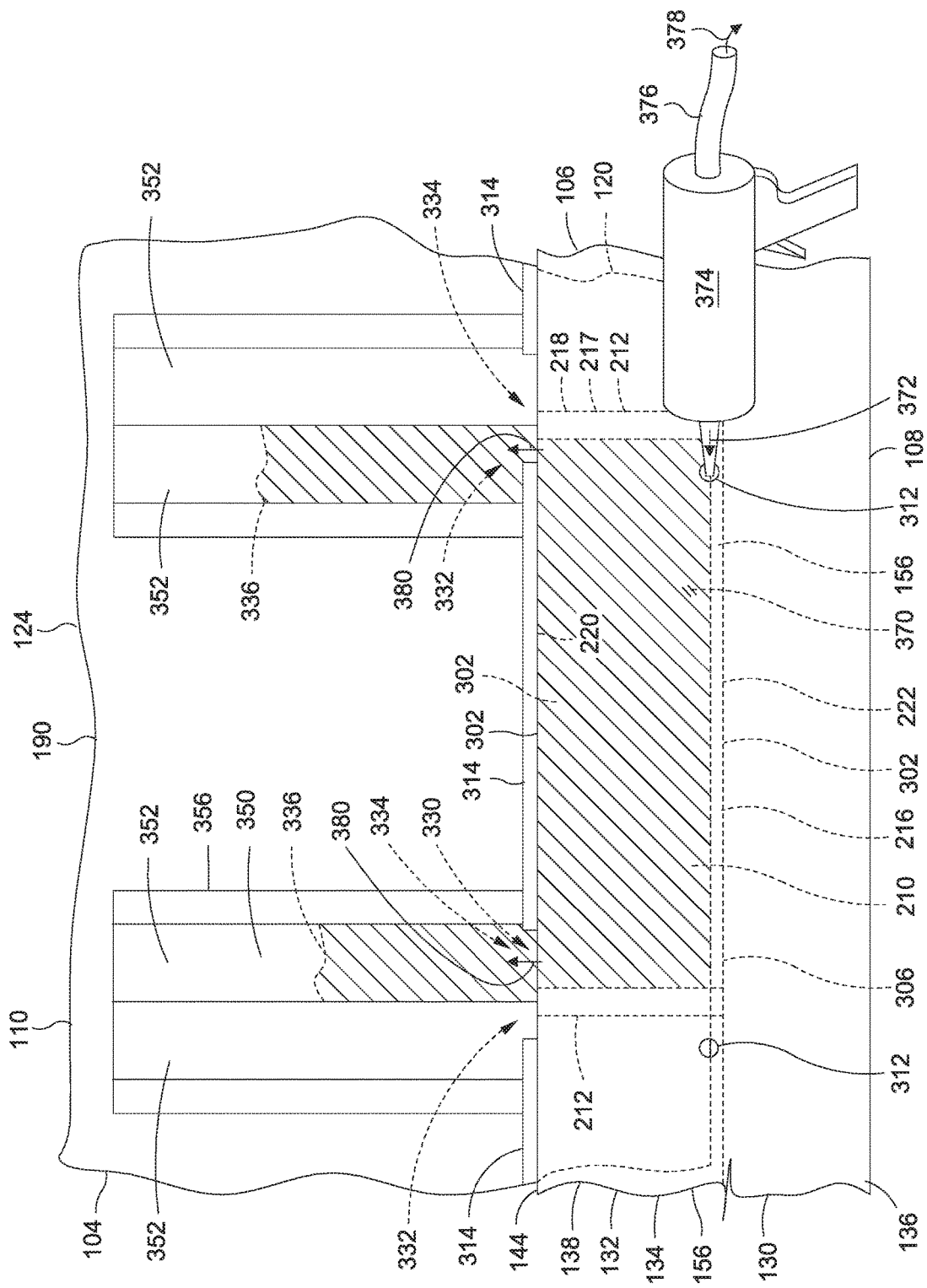

STRUCTURAL ASSEMBLY HAVING INJECTION-BONDED JOINT AND METHOD OF FORMING

CROSS-REFERENCE TO RELATED APPLICATIONS

The present application is a divisional application of and claims priority to pending U.S. application Ser. No. 13/774,246 filed on Feb. 22, 2013, and entitled SYSTEM AND METHOD OF FORMING AN INJECTION BONDED JOINT, the entire contents of which is expressly incorporated by reference herein.

FIELD

The present disclosure relates generally to structural joints and, more particularly, to adhesively bonded joints of relatively long length.

BACKGROUND

Bonded joints are typically formed by applying a layer of adhesive to the mating surfaces of one or more parts to be joined. The parts are then brought together and held in position relative to one another while allowing the adhesive in the bondline to cure. For example, when bonding an end ring having a C-channel cross-section to an edge of a cylinder, the end ring may be oriented such that the C-channel is facing upwardly. A pool of adhesive may be installed within the C-channel and the cylinder edge may be lowered down into the C-channel. The adhesive may spill out of the C-channel until the cylinder edge contacts the bottom of the C-channel. The cylinder and the end ring may be held in position while the adhesive cures.

Unfortunately, the above-noted process may produce less-than-desirable results in the final bonded joint between the end ring and the cylinder. In this regard, the relatively long length of the bondline extending around the cylinder circumference may result in unpredictability with regard to the flow of adhesive in the C-channel as the cylinder is lowered into the end ring. For example, the long length bondline may affect the ability of the adhesive to flow from the bottom of the C-channel to the top edge of the C-channel at all locations around the cylinder circumference as the cylinder edge is lowered into the C-channel.

Such unpredictability with regard to adhesive flow may result in reworking the bonded joint to bring the bonded joint to within design tolerances. In cases where repair of the bonded joint is not possible, it may be necessary to scrap the bonded parts and assemble a replacement which may have a detrimental impact on cost and schedule. The unpredictability associated with adhesive flow may also require the installation of anti-peel fasteners along the bondline to prevent peeling of the bonded joint at the edges of the bondline. Unfortunately, the installation of anti-peel fasteners may add to the cost, complexity, and weight of the structural assembly.

As can be seen, there exists a need in the art for a system and method of forming a bonded joint that provides a means for controlling the flow of adhesive within the bondline during the bonding process. In this regard, there exists a need in the art for a system and method of forming a bonded joint that provides predictability with regard to the flow of adhesive in long length bondlines.

SUMMARY

The above-noted needs associated with bonded joints are specifically addressed and alleviated by the present disclosure which provides a method of forming an injection-bonded joint. The method may include forming a chamber wall within a bondline region between mating surfaces of a first part and a second part. The chamber wall may divide a bondline length and defining at least one adhesive chamber. The method may additionally include injecting a structural adhesive into the adhesive chamber through an injection port, and discharging excess adhesive from the adhesive chamber through a bleed hole.

In a further embodiment, disclosed is a method of forming an injection-bonded joint including the step of forming a series of chamber walls within a bondline region between mating surfaces of a first part and a second part. The chamber walls may divide the bondline length into a plurality of adhesive chambers. The method may additionally include forming bondline dams along a part edge of at least one of the first part and the second part. The chamber walls, the bondline dams, and the mating surfaces may collectively enclose the adhesive chambers. The method may further include injecting a structural adhesive into the adhesive chambers through an injection port formed in one of the first part and the second part, discharging excess adhesive from the adhesive chambers through at least one bleed hole, and collecting the excess adhesive in adhesive reservoirs fluidly coupled to the bleed holes Also disclosed is a structural assembly made up of a first part and a second part. The first part and the second part may have mating surfaces that may be adhesively bonded together along a bondline region having a bondline length. The structural assembly may include a series of chamber walls formed along the bondline length and dividing the bondline length into a plurality of adhesive chambers. The structural assembly may include a structural adhesive injected into the adhesive chambers through at least one injection port to bond the first part to the second part.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a cross-sectional illustration of a spacecraft encapsulated within a launch vehicle;

FIG. 2 is a perspective illustration of an embodiment of a structural assembly for supporting the spacecraft of FIG. 1 and comprising a structural cylinder having an internal ring, an external ring, and a pair of end rings with C-channel cross-sections bonded to a structural cylinder;

FIG. 14 is a side schematic illustration of the bonded joint of FIG. 11 and showing the adhesive chamber in a filled state with excess adhesive contained in the adhesive reservoirs on opposite sides of the center adhesive chamber;

DETAILED DESCRIPTION

Figure 3:
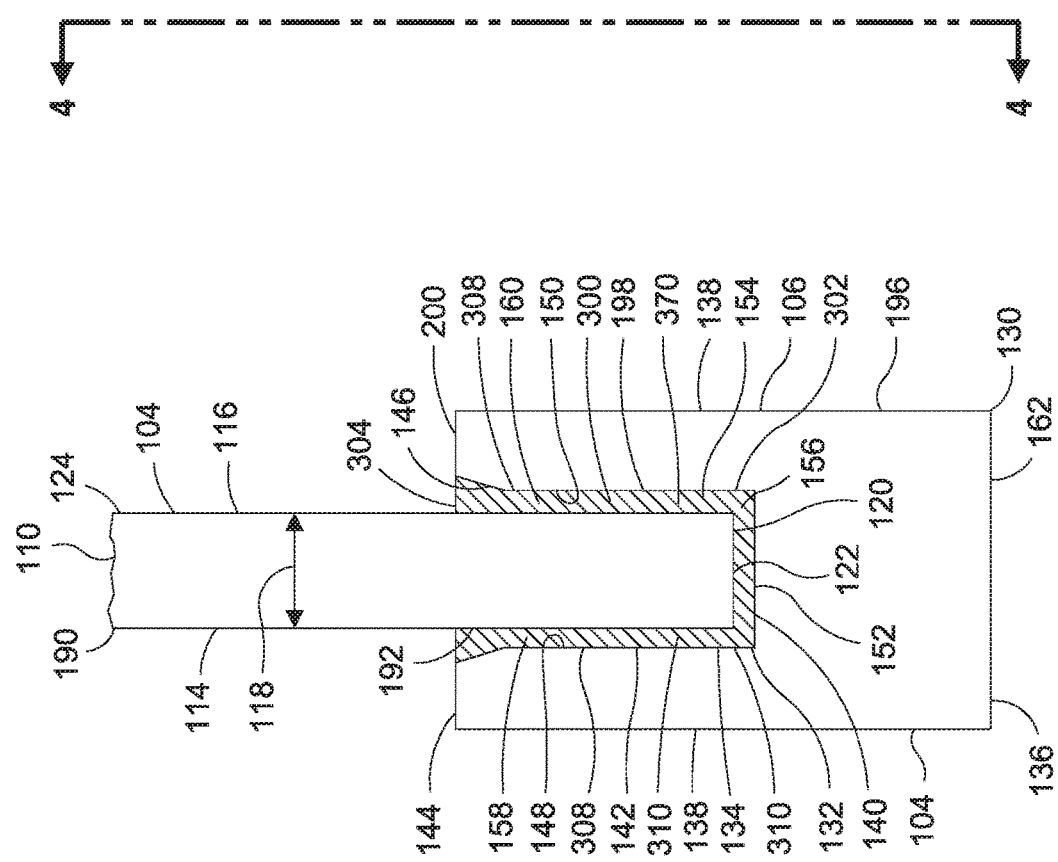
FIG. 3 is a cross-sectional illustration of the end ring taken along line 3 of FIG. 2 and illustrating a bonded joint between the C-channel cross-section and the cylinder edge of the cylinder.

Referring now to the drawings wherein the showings are for purposes of illustrating preferred and various embodiments of the disclosure, shown in FIG. 1 is a sectional illustration of spacecraft 102 encapsulated within a launch vehicle 100. The spacecraft 102 may be supported on a central core structural assembly 104 having a cylindrical configuration and extending vertically through the center of the spacecraft 102.

FIG. 2 illustrates an embodiment of the cylindrical structural assembly 104. The structural assembly 104 may include a cylinder 110 which may be formed of fiber-reinforced polymer matrix material 124 although the cylinder 110 may be formed of metallic material (not shown) or a combination of composite material and metallic material and/or other materials. The structural assembly 104 may additionally include one or more rings 130, 170, 172 that may be bonded to the cylinder 110 to increase the strength of the cylinder 110 and/or accommodate localized loads and/or interface loads at locations where the cylinder 110 attaches to mating components (not shown) such as at an interface (not shown) between the launch vehicle 100 (FIG. 1) and the spacecraft 102 (FIG. 1). In the embodiment shown, the rings may include an internal ring 170, an external ring 172, and a pair of end rings 130.

Advantageously, in FIG. 2, the rings 130, 170, 172 are adhesively bonded to the cylinder 110 using an injection-bonding method disclosed herein which provides a means for bonding the rings 130, 170, 172 to the cylinder 110 with a significant increase in the quality and consistency of the bond joints 106 relative to conventionally-bonded joints. The injection bonding method disclosed herein advantageously includes adhesive chambers 210 formed in a bondline region 300 between the mating surfaces 192, 194 of the mated parts. The adhesive chambers 210 may be provided by constructing a series of chamber walls 212 within the bondline region 300. The chamber walls 212 may be spaced apart from one another along the bondline length 306 to break up the bondline length 306 into short, defined, adhesive chambers 210. The chamber walls 212 may be spaced apart from one another at a substantially equal spacing 224 from one another, or the chamber walls 212 may be spaced apart from one another at unequal spacings (not shown). Structural adhesive 370 may be injected into each one of the adhesive chambers 210 in a controlled manner and the structural adhesive 370 may be allowed to cure.

As described in greater detail below, in FIG. 2, by breaking up the bondline length 306 and controlling the flow of structural adhesive 370 within the short, defined segment of each adhesive chamber 210, the structural adhesive 370 may fill each adhesive chamber 210 by rising to the top (not shown) of the adhesive chamber 210 and staying there until a substantial entirety of the adhesive chamber 210 is filled with structural adhesive 370. In this manner, the potential for the occurrence of voids (not shown) or air bubbles (not shown) along the bondline perimeter 302 such as along the top edge (not shown) of the adhesive chamber 210 may be significantly reduced or eliminated. The reduction or elimination of voids (not shown) and air bubbles (not shown) at high-stress locations (not shown) along the bondline perimeter 302 (FIG. 3) may result in an increase in the overall strength and durability of the bonded joint 106 relative to conventionally-bonded joints.

In FIG. 2, the bonding method is specifically advantageous for relatively long length geometry features 108 which may be characterized as bondline regions 300 having a long bondline length 306 relative to the bondline width 308. For example, in the context of the cylindrical structural assembly 104 illustrated in FIG. 2, the relatively long length geometry feature 108 may be represented by the long distance around the cylinder circumference 112 relative to the short bondline width 308. Advantageously, the presently-disclosed bonding method allows for the elimination of bolts (not shown) or other mechanical fasteners in the cylindrical bonded joints 106 which provides significant advantages over conventionally-bonded joints (not shown) in cylindrical structures that require mechanical fasteners (not shown) to achieve the required strength and durability in such conventionally-bonded joints. In this regard, the presently-disclosed method provides a means for forming high-strength, high-durability bonded joints 106 in cylindrical structural assemblies 104 with no mechanical fasteners and resulting in significant weight savings relative to conventional bonded/mechanically fastened cylindrical joints.

In FIG. 2, the adhesive chambers 210 may additionally provide increased flexibility with regard to the amount of time available for completing a bonded joint 106 within the pot life of the structural adhesive 370. For example, in an embodiment, a portion of the adhesive chambers 210 in a bondline region 300 may be filled with structural adhesive 370 and allowed to cure. Remaining portions of the adhesive chambers 210 of the bondline may then be filled and allowed to cure during one or more subsequent bonding operations. In the context of the cylindrical structural assembly 104 shown in FIG. 2, the effect of the injection bonding method disclosed herein is an elimination of the mass penalty otherwise associated with attachment of the rings 130, 170, 172 to the cylinder 110 using mechanical fasteners (not shown). The elimination of the mass penalty translates into a reduction in the structural mass of the spacecraft 102. The reduction in spacecraft 102 structural mass may allow for an increase in the amount of fuel (not shown) carried by the spacecraft for the attitude control system (not shown) which may result in an increase in the operational life of the spacecraft 102.

Although the bonding method disclosed herein is described in the context of a cylindrical structural assembly 104 (FIG. 2) for a spacecraft 102 (FIG. 1), the bonding method may be implemented in any one of a variety of different applications and in any one of a variety of different industries. For example, the bonding method may be implemented in commercial, civil, and military applications. Furthermore, the bonding method may be incorporated into a wide variety of platforms including, but not limited to, marine, automotive, aircraft, and/or space platforms. In this regard, the bonding method may be incorporated into any vehicular system or non-vehicular system, without limitation.

In FIG. 3, shown is a cross-sectional illustration of an embodiment of a bonded joint 106 between a first part 190 and a second part 196 having mating surfaces 192, 198 adhesively bonded together. In FIG. 3, the first part 190 comprises a cylinder 110 and the second part 196 comprises an end ring 130 having a cross-section 132 configured as a C-channel 134. The cylinder 110 has a cylinder outer surface 116 and a cylinder inner surface 114 defining a cylinder thickness 118. In addition, the cylinder 110 has a cylinder edge 120 which may be adhesively bonded within the C-channel 134. The end ring 130 may include a base 136 and a pair of flanges 138 defining the C-channel 134 cross-section 132. One or both of the channel edges 144 may include a chamfered edge 146 to minimize stress concentrations in the cylinder 110 at the location of the channel edges 144. The end ring 130 may have a channel depth 142 corresponding to the bondline width 308 and extending from the channel bottom surface 152 to the channel edge 144. The distance between the channel side surfaces (i.e., the channel side inner surface 148 and the channel side outer surface 150) may define a channel width 140.

In FIG. 3, the cylinder 110 may be positioned within the C-channel 134 such that the gap 160 between the cylinder outer surface 116 and the channel side outer surface 148 is substantially equalized with the gap 158 between the cylinder inner surface 114 and channel side inner surface 148. In addition, the cylinder 110 may be positioned vertically relative to the end ring 130 such that the gap 156 between the channel bottom surface 152 and the cylinder edge surface 122 is substantially equalized with the gaps 158, 160 between the cylinder 110 and the flanges 138. The bonding process may include a means for maintaining the position of the cylinder 110 relative to the end ring 130 such that the desired gaps 156, 158, 160 are fixed (i.e., non-changing) during the injection of structural adhesive 370 into the adhesive chambers 210 (FIG. 2) and during curing of the structural adhesive 370.

Figure 4:
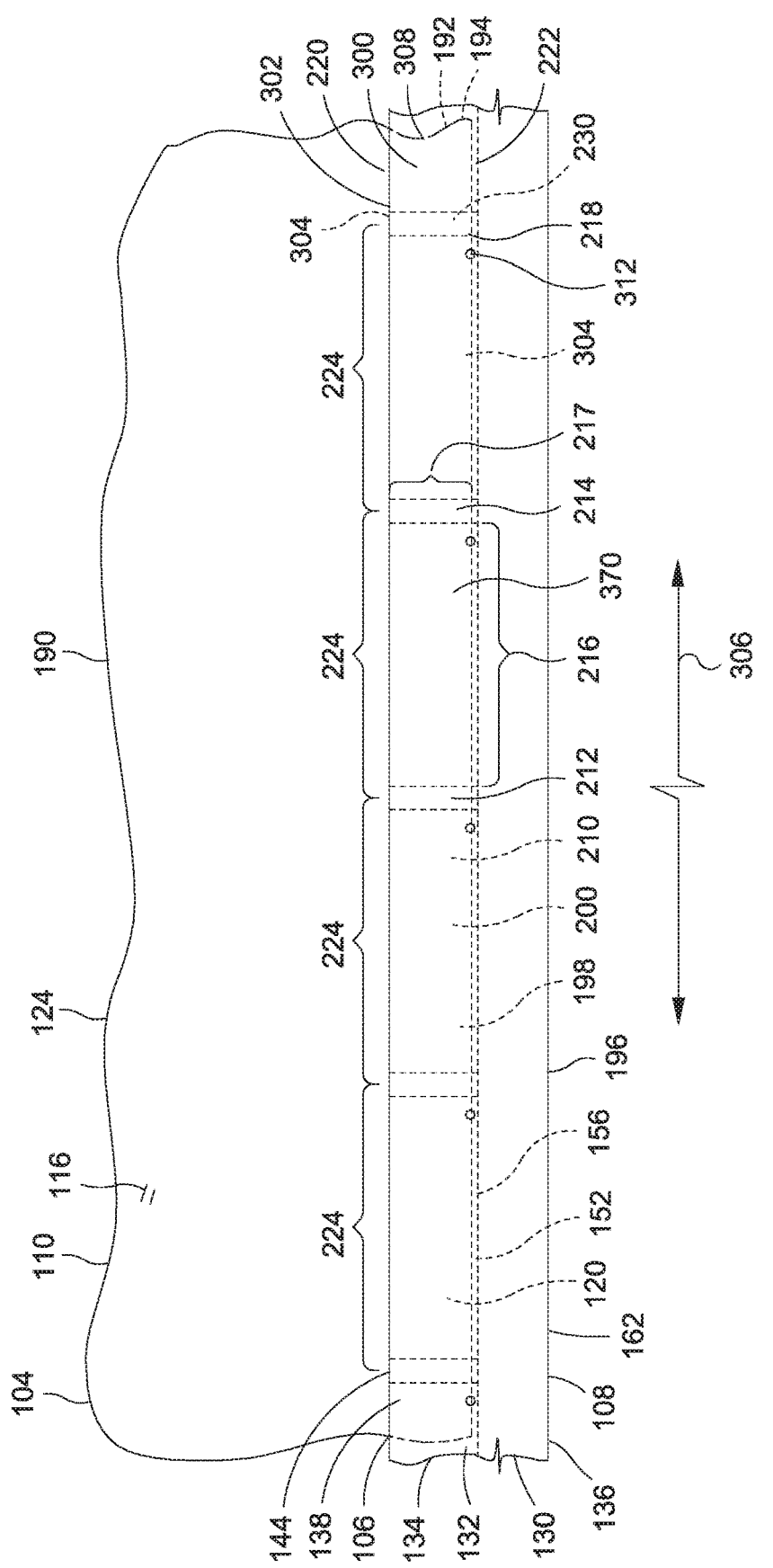
FIG. 4 is a flat pattern layout of the bonded joint between the mating surfaces of the end ring and the cylinder and illustrating the relatively long bondline length of the bondline region at the bondline joint.

In FIG. 4, shown is a flat pattern layout of the bonded joint 106 between the end ring 130 and the cylinder 110 of FIG. 3. FIG. 4 illustrates the relatively long bondline length 306 of the bondline region 300 between the end ring 130 and the cylinder edge 120. In an embodiment, the long length geometry feature 108 may be defined as a bondline length 306 that is at least approximately twice the bondline width 308 of the bonded joint 106. However, the bondline length 306 may be less than the bondline width 308.

In FIG. 4, the bonded joint 106 advantageously includes a series of chamber walls 212 spaced apart from one another along the bondline length 306 and dividing the bondline length 306 into a plurality of adhesive chambers 210. In the embodiment shown, the chamber walls 212 are oriented generally transverse to the bondline length 306. In this regard, the chamber walls 212 may extend across the bondline width 308 between opposing bondline edges 304 of the bondline region 300. The chamber walls 212 may be oriented in non-parallel relation to the bondline length 306. For example, one or more of the chamber walls 212 may be oriented generally perpendicular to the bondline length 306 although the chamber walls 212 may be oriented in any direction relative to the bondline length 306 and are not limited to a perpendicular orientation. Furthermore, although each one of the chamber walls 212 is shown as having a generally straight shape, the chamber walls 212 may be formed in any size, shape, and configuration, without limitation. For example, the chamber walls 212 may be curved or provided in other shapes or configurations.

As described in greater detail below, in FIG. 4, each one of the adhesive chambers 210 may be filled with structural adhesive 370 to bond the mating surfaces 192, 198 of the first part 190 (e.g., the cylinder 110) and the second part 196 (e.g., the end ring 130). A structural adhesive may be selected that is compatible with the material of the first part 190 and the material of the second part 196. As indicated above, the first part 190 may be formed of a material that is different than the material of the second part 196. For example, the first part 190 may comprise the cylinder 110 which may be formed of fiber-reinforced polymer matrix material 124 such as a carbon fiber/epoxy matrix material. The second part 196 may comprise the end ring 130 which may be formed of metallic material 162 such as aluminum. However, the first part 190 and the second part 196 may be formed of any material, and may be of any shape, size, and configuration, without limitation.

In FIG. 4, the structural adhesive 370 may be injected into each one of the adhesive chambers 210 through at least one injection port 312. In an embodiment, one or more injection ports 312 may be formed in the first part 190 and/or in the second part 196. However, injection ports 312 may be formed at any location that allows for injection of structural adhesive 370 into the adhesive chambers 210. For example, although not shown, one or more injection ports 312 may be located proximate or formed in the part edges 194, 200.

Referring to the flow chart of FIG. 23 with additional reference to FIGS. 5-22, the method 400 of forming a bonded joint 106 (FIG. 4) will now be described. In the context of bonding the aft end ring 130 (FIG. 5) to the cylinder 110 (FIG. 5), the end ring 130 may initially be dry-fitted to the cylinder 110 without structural adhesive 370 (FIG. 4) prior to initiating the bonding process. Dry-fitting may comprise positioning the end ring 130 such that the C-channel 134 (FIG. 5) is facing upwardly, and then lowering the cylinder 110 into the C-channel 134 for checking and equalizing gaps 158, 160 (FIG. 3) between the channel side inner and outer surfaces 148, 150 (FIG. 3) and the cylinder inner and outer surfaces 114,116 (FIG. 3) around the cylinder circumference 112 (FIG. 2), and adjusting the gaps 156 (FIG. 3) between the channel bottom surface 152 (FIG. 3) and the cylinder edge surface 122 (FIG. 3). Pins (not shown) may be installed to fix the relative position of the cylinder 110 and the end ring 130. The gaps 156, 158, 160 may be measured and recorded to establish the bondline thickness 310 (FIG. 3) between the mating surfaces of the cylinder 110 and the end ring 130. Once the gaps 156, 158, 160 are equalized or adjusted, the pins (not shown) may be removed and the cylinder 110 may be separated from the end ring 130 to allow for cleaning of the mating surfaces such as by solvent-wiping in preparation for bonding. Non-bonded surfaces (not shown) of the cylinder 110 and/or end ring 130 may be covered with masking tape (not shown) or other material to protect against contact with structural adhesive 370 (FIG. 3) during the bonding process.

Figure 5:
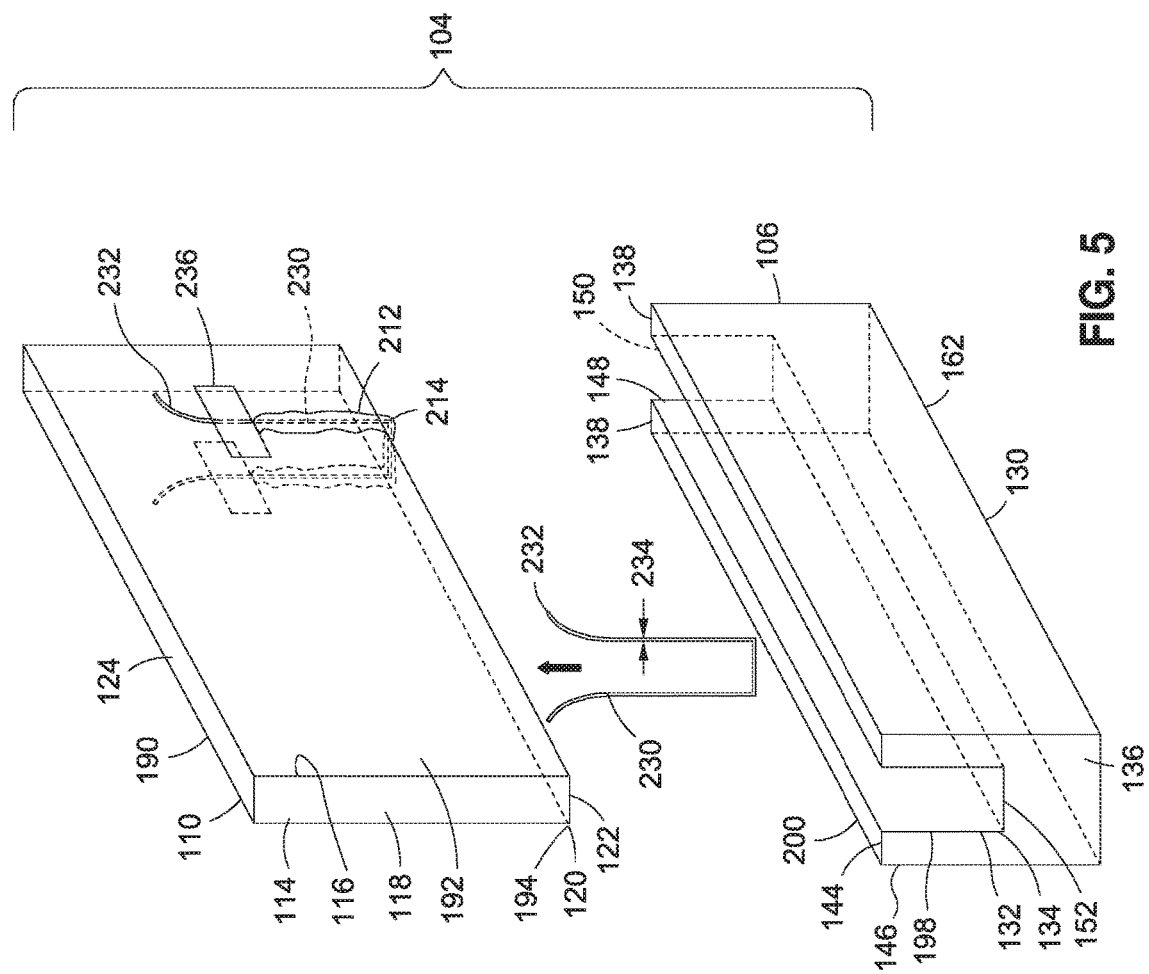
FIG. 5 is an exploded perspective diagrammatic illustration of a portion of an embodiment of a bonded joint and illustrating a pair of bond wires mountable against the cylinder edge prior to inserting the cylinder edge into the C-channel.

Referring to FIG. 5, Step 402 of the method 400 (FIG. 23) may include forming chamber walls 212 at predetermined spacing 224 (FIG. 4) from one another along the bondline length 306 (FIG. 4). In an embodiment, the chamber walls 212 may be located such that each adhesive chamber 210 has a chamber length 216 (FIG. 4) that is the greater than the chamber width 217 (FIG. 4). The chamber walls 212 may be formed using an adhesive 214 that may be applied to a bond wire 230. The adhesive-coated bond wire 230 may then be mounted to the first part 190 (e.g., the cylinder 110) prior to mating the first part 190 (e.g., the cylinder 110) with the second part 196 (e.g., the end ring 130). However, the present disclosure contemplates applying adhesive 214 to the first part (e.g., the cylinder 110) without a bond wire 230. Alternatively, the adhesive 214 may be applied to the second part 196 (e.g., the end ring 130) instead of the first part 190 to form the chamber walls 212. The method may include forming the chamber walls 212 generally transverse to the bondline length 306 (FIG. 4). The chamber walls 212 may be oriented in non-parallel relation to the bondline length 306 such as in perpendicular orientation to the bondline length 306. However, the chamber walls 212 may be formed in any configuration or shape that divides the bondline length 306 as indicated above.

In FIG. 5, Step 404 of the method 400 (FIG. 23) may comprise including a bond wire 230 in one or more of the chamber walls 212. The bond wires 230 may set the gap 154 (FIG. 3) or bondline thickness 310 (FIG. 3) between the mating surfaces 192, 198 and may assist as a barrier for the adhesive chamber 210. The method may include selecting a wire diameter 234 based upon the desired gap 154 or bondline thickness 310 between the mating surfaces. If bond wires 230 are not available in a wire diameter 234 than matches the gap 154 (FIG. 3) size, then a wire diameter 234 may be selected that is slightly smaller than the gap 154 size, and shims 238 (FIG. 6) may be employed to assist in forming the desired gap 154 (FIG. 3) between the mating surfaces 192, 198 as described below. In addition, the shim 238 may facilitate sealing the chamber wall 212 adhesive 214 to the mating surfaces 192, 198, and shaping the sides of the chamber walls 212.

In FIG. 5, each one of the bond wires 230 may be pre-formed in a desired shape such as in a U-shape to match the cylinder edge 120 and such that the bond wire 230 has free ends 232 that will extend upwardly beyond the channel edge 144 when the cylinder 110 is installed in the C-channel 134. The bond wires 230 may be cleaned such as by solvent wiping and adhesive 214 may be applied to the bond wires 230 such as by using a syringe (not shown). The method may include coating the bond wires 230 with adhesive 214 with preferably no bare wire showing. The adhesive 214 may be provided in a relatively high viscosity such as a paste-like viscosity such that the adhesive 214 is retained on the bond wires 230. The bond wires 230 may be positioned against the surface of the first part 190 (i.e., the cylinder 110) at predetermined spacings 224 (FIG. 4) from one another such that the bond wires 230 divide the bondline length 306 (FIG. 4). The method may include taping the free ends 232 of the bond wires 230 to the cylinder inner and outer surfaces 114, 116 with tape 236.

Figure 6:
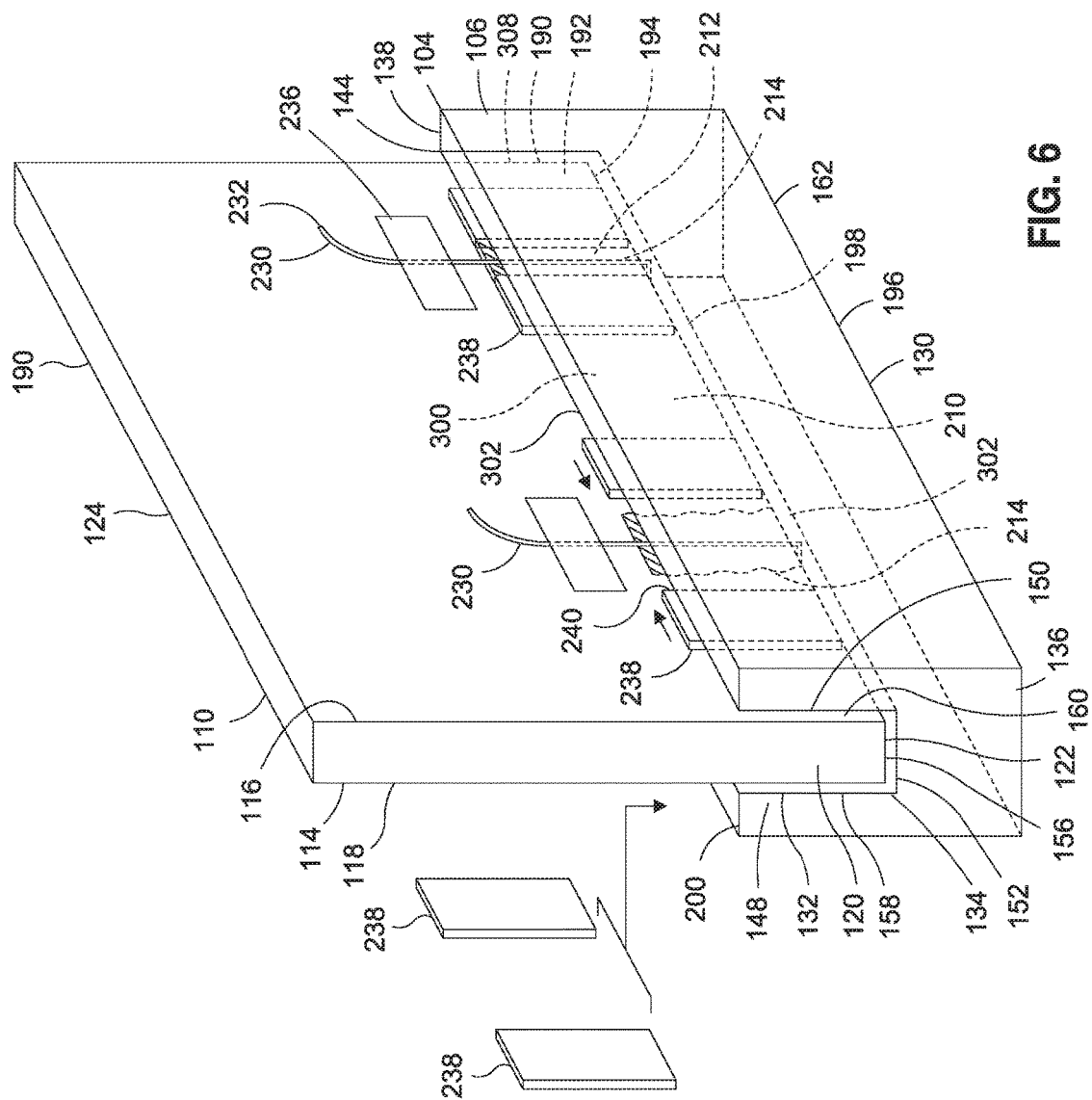
FIG. 6 is a perspective schematic illustration of the bonded joint of FIG. 5 showing a pairs of shims temporarily installed on opposite sides of the bond wires to assist in forming the chamber walls dividing the bondline length.

In FIG. 6, the method may include assembling the cylinder 110 (i.e., the first part 190) with the end ring 130 (i.e., the second part 196) by inserting the cylinder edge 120 into the C-channel 134. The process of installing the bond wires 230, installing the adhesive 214, and assembling the cylinder 110 with the end ring 130, and shaping or finalizing the chamber walls 214 is preferably completed within the pot life of the adhesive 214. The free ends 232 of each bond wire 230 may be held in position using the tape 236 as shown. The cylinder 110 may be pinned in position using pins (not shown) for fixing the cylinder 110 and end ring 130 in the same position determined during the dry-fitting process.

In FIG. 6, the method may include temporarily inserting a pair of shims 238 within the bondline region 300 between the cylinder 110 and flanges 138 of the end ring 130. The shims 238 may be fabricated at a shim thickness that corresponds to the gap 154 (FIG. 3) size or bondline thickness 310 (FIG. 3) measurements from the dry-fitting process. The bond wires 230 may be provided in a wire diameter 234 that substantially matches the desired gap 154 between the mating surfaces 192, 198 such that the bond wires set the bondline thickness 310 (FIG. 3) between the mating surfaces 192, 198. If the bond wires 230 are not available in a wire diameter 234 that matches the gap 154 size, then the next-smallest wire diameter may be used in the chamber walls and the shims 238 may be employed to set the gap 154 size between the mating surfaces 192, 198. The shims 238 may be formed of any material including any metallic or nonmetallic material and may be covered or wrapped with a non-silicone material (not shown) such as Teflon™ tape (not shown) or other material that facilitates separation of the shims 238 from the chamber walls 212 after the adhesive 214 has cured.

As shown in FIG. 6, the shims 238 may be positioned on opposite sides of each bond wire 230 at an initial spacing from one another. The method may include moving the shims 238 toward one another to a final spacing wherein the shim edges 240 may compact the adhesive 214 of the chamber wall 212 to seal the adhesive 214 to the mating surfaces 192, 198 and remove voids from the adhesive 214. In addition, the shims 238 may provide a defined (e.g., straight) edge to the chamber wall 212. The shims 238 may be moved toward one another such that the shims edges 240 are generally parallel to one another and spaced apart from one another at a distance corresponding to a desired width of the chamber walls 212. For example, the shims 238 may be moved toward one another at spacing of approximately 0.25 inch or at other spacing distances. In an alternative embodiment, the chamber walls 212 may be formed without bond wires 230 by inserting shims 238 into the bondline region 300 and then injecting adhesive 214 into a mold space (not shown) defined by the spacing between shim edges 240. Regardless of the manner in which the chamber walls 212 are formed, the adhesive 214 in the chamber walls 212 may be allowed to cure prior to removing the shims 238 and prior to injecting structural adhesive 370 (FIG. 3) into the adhesive chamber 210.

In FIG. 6, the bond wires 230 may be formed of any material and are not limited to being formed of metallic wire. In addition, a chamber wall 212 may be formed without the use of adhesive 214. For example, a chamber wall 212 may be configured as a mechanical device (not shown) that may be fixedly positioned across the bondline width 308 in a manner that provides substantial sealing to an adhesive chamber 210. In a further embodiment, as indicated above, bond wires 230 may be omitted from the chamber walls 212 and the adhesive 214 may be applied directly to the exterior of the cylinder edge 120 prior to lowering the cylinder 110 into the C-channel 134. Shims 238 may be positioned on opposite sides of the adhesive 214 and moved toward one another to form the adhesive 214 into chamber walls 212. The shims 238 may be removed prior to injection bonding of structural adhesive 370 (FIG. 3) into the adhesive chambers 210.

Figure 7:
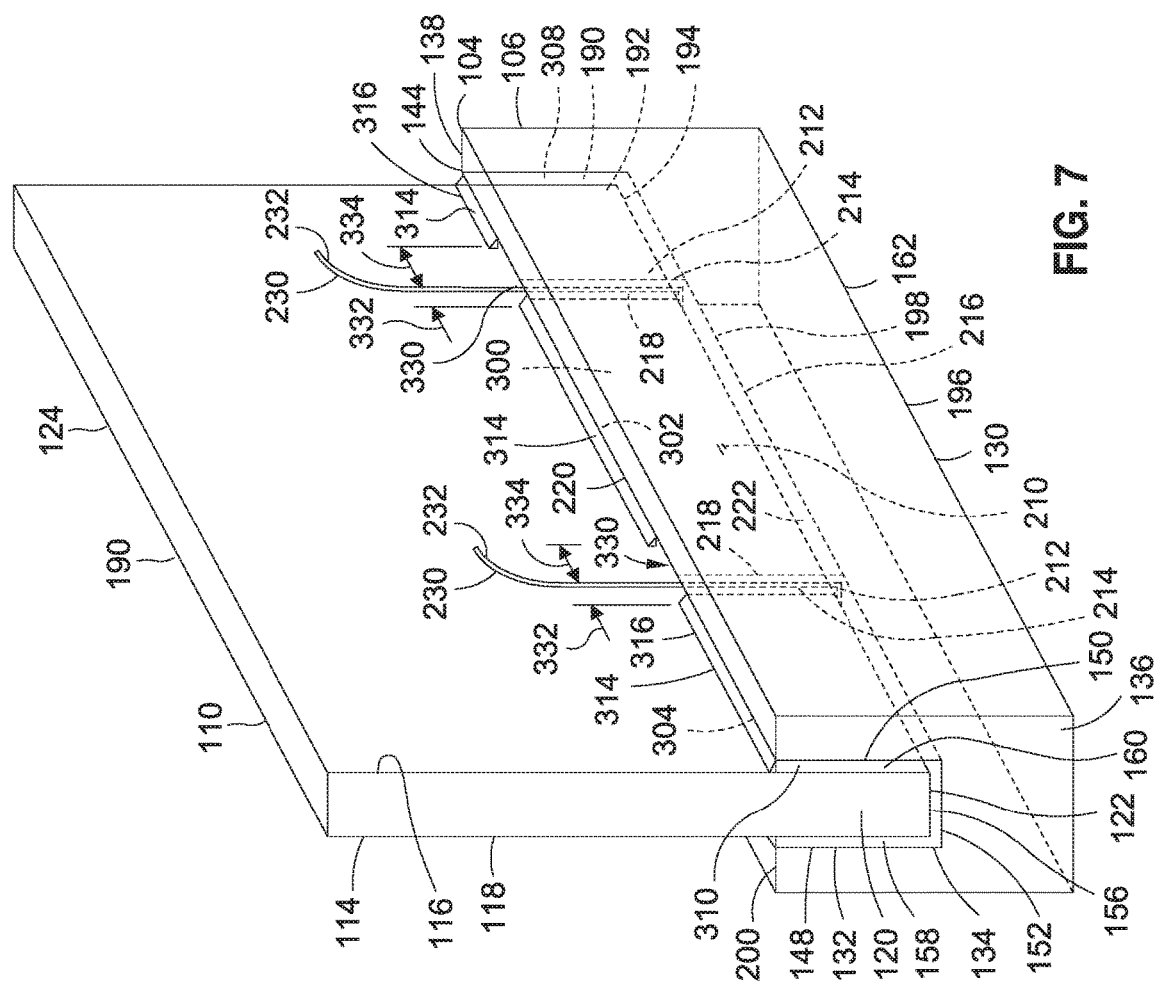
FIG. 7 is a perspective schematic illustration of the bonded joint of FIG. 6 showing a bondline dam installed along a channel edge of the C-channel and further illustrating bleed holes formed as openings in the bondline dam.

In FIG. 7, Step 406 of the method 400 (FIG. 23) may comprise forming one or more bondline dams 314 along one or more bondline edges 304 of the bondline region 300. One or more of the bondline dams 314 may be formed of a relatively high-viscosity adhesive 316 or other material having the capability to adhere to the cylinder 110 and the end ring 130 and remains in position during the bonding process and resist the pressure of the structural adhesive 370 (FIG. 3) during injection thereof into the adhesive chamber 210. In an embodiment, the bondline dams 314 may be formed of an adhesive 316 having a higher viscosity that the viscosity of the structural adhesive 370 that is injected into the adhesive chamber 210. The bondline dams 314 may be formed along a part edge 194, 200 of the first part 190 (e.g., the cylinder 110) and/or the second part 196 (e.g., end ring 130) being bonded together.

Figure 11:
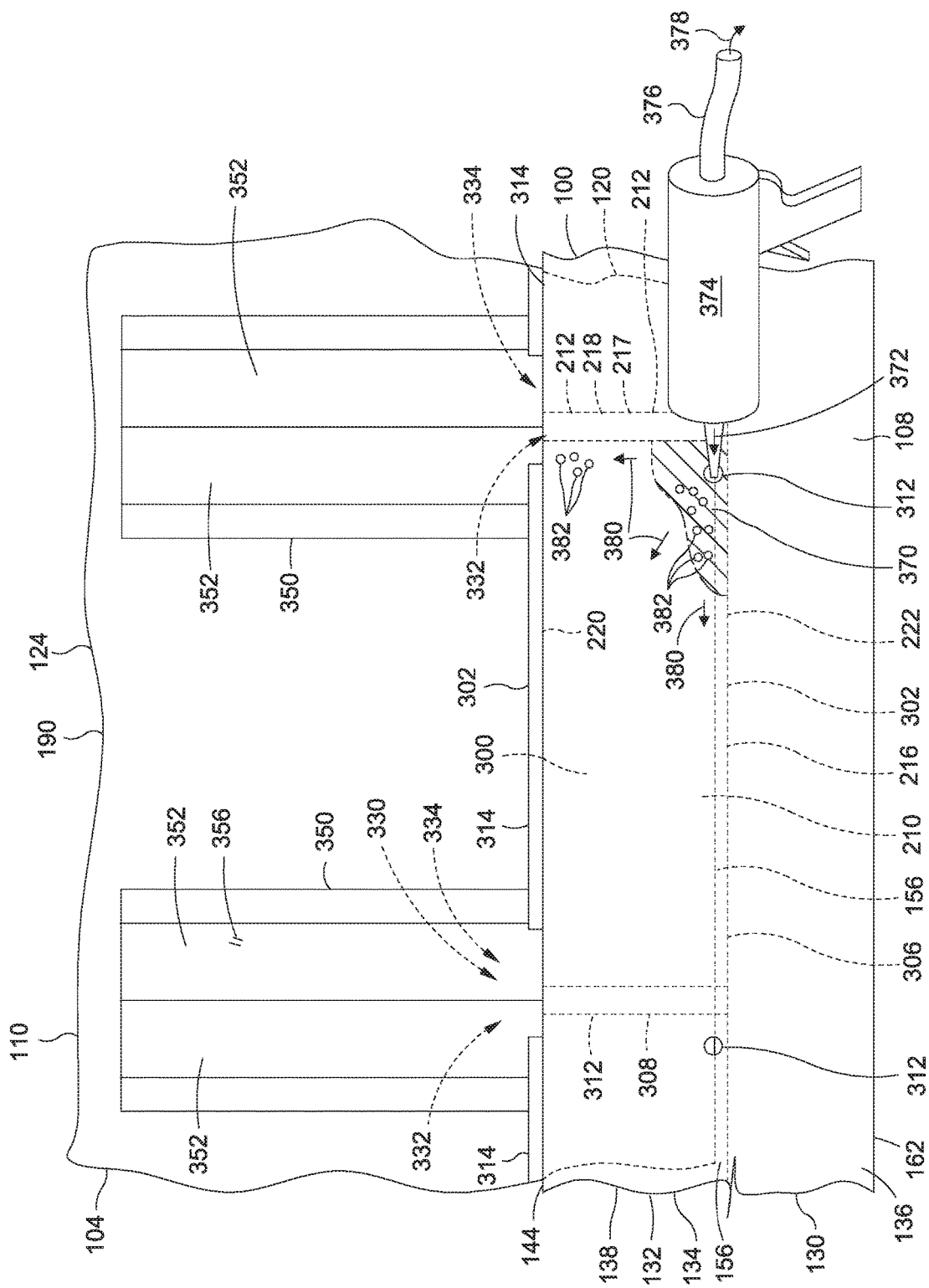
FIG. 11 is a side schematic illustration of the bonded joint of FIG. 10 and showing the injection of structural adhesive into the adhesive chamber defined by the chamber walls and illustrating the flow direction of the structural adhesive and air bubbles within the adhesive chamber.

In FIG. 7, bondline dams 314 may be formed along the upper channel edges 144 of the end ring 130 on both sides of the cylinder 110. One or more of the bondline dams 314 may terminate at a spaced distance from the chamber walls 212 to form a bleed hole 330 for the discharge of excess adhesive 336 (FIG. 12) from the adhesive chamber 210. In an embodiment, each bleed hole 330 may be located proximate an upper edge 220 of the adhesive chamber 210. In addition, each bleed hole 330 may be located proximate a chamber wall 212. Positioning of the bleed holes 330 along the upper edge 220 of the adhesive chamber 210 and proximate the chamber walls 212 may facilitate the evacuation of air bubbles 382 (FIG. 11) from the adhesive chamber 210 during the injection of structural adhesive 370 (FIG. 11). However, the bleed holes 330 may be located at any position on the adhesive chamber 210. In an embodiment, one or more of the adhesive chambers 210 may include a large bleed hole 334 and a small bleed hole 332 located at opposing chambers ends 218 of the adhesive chamber 210. The large bleed hole 334 and the small bleed hole 332 may be formed in any size, without limitation. As described in greater detail below, the arrangement of the large bleed hole 334 and the small bleed hole 332 may facilitate the evacuation of air bubbles 382 from the adhesive chamber 210.

In FIG. 7, the configuration of the bondline dam 314 and the bleed holes 330 on the cylinder inner surface (not shown) may be similar to the configuration of the bondline dam 314 and the bleed holes 330 on the cylinder outer surface 116. However, the configuration of the bondline dam 314 and the bleed holes 330 on each side of the cylinder 110 may be different. The bondline dams 314 and the chamber walls 212 may define at least a portion of the bondline perimeter 302. The chamber walls 212, the bondline dams 314, and the mating surfaces 192, 198 may collectively enclose the adhesive chambers 210. The bondline dams 314 may be formed from adhesive 316 such as by using a syringe (not shown). The method may include allowing the adhesive 316 of the bondline dam 314 to cure prior to injecting structural adhesive 370 (FIG. 11) into the adhesive chamber 210. Although the bondline dams 314 are described as being formed of adhesive 316, it is contemplated that the bondline dams 314 may comprise a mechanical device (not shown) such as a rigid member that may be mechanically coupled or otherwise attached to the first part 190 and/or second part 196 along the bondline perimeter 302.

Figure 8:
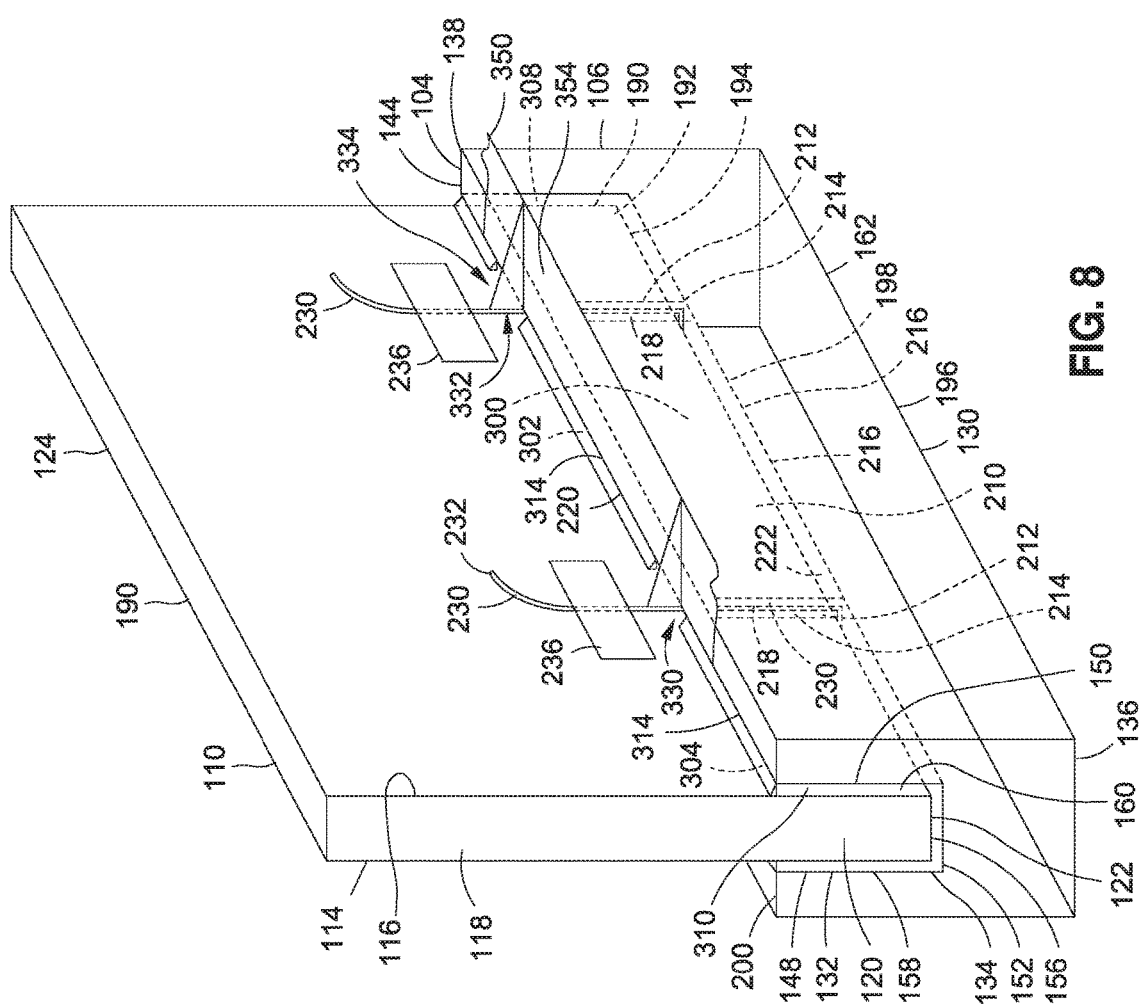
FIG. 8 is a perspective schematic illustration of the bonded joint of FIG. 7 showing an embodiment of an adhesive reservoir configured as a shelf and positioned along the channel edge.

In FIG. 8, the method may include forming one or more adhesive reservoirs 350 for collecting excess adhesive 336 (FIG. 12) that may be discharged from the bleed holes 330 during injection of the structural adhesive 370 (FIG. 12) into the adhesive chambers 210. In an embodiment, one or more of the adhesive reservoirs 350 may be formed as a shelf 354 that extends laterally outwardly from the cylinder 110 and/or from the end ring 130. The adhesive reservoirs 350 may collect excess adhesive (not shown) that may flow outwardly as a pool onto the shelf 354 during the discharge of excess adhesive 336 from the bleed holes 330. The shelf 354 may be configured to collect the excess adhesive 336 and/or prevent the excess adhesive 336 from flowing onto the exterior of the structural assembly 104. The shelf 354 may be formed of non-silicone material such as polymeric tape or sheeting and/or chromate tape or other material that may be applied to the end ring 130 and/or cylinder 110. In an embodiment, each adhesive chamber 210 may include a dedicated shelf 354 that may be physically separated from the dedicated shelf 354 of the adjacent adhesive chamber 210 such that each shelf 354 contains the excess adhesive 336 discharged from the corresponding adhesive chamber 210.

Figure 9:
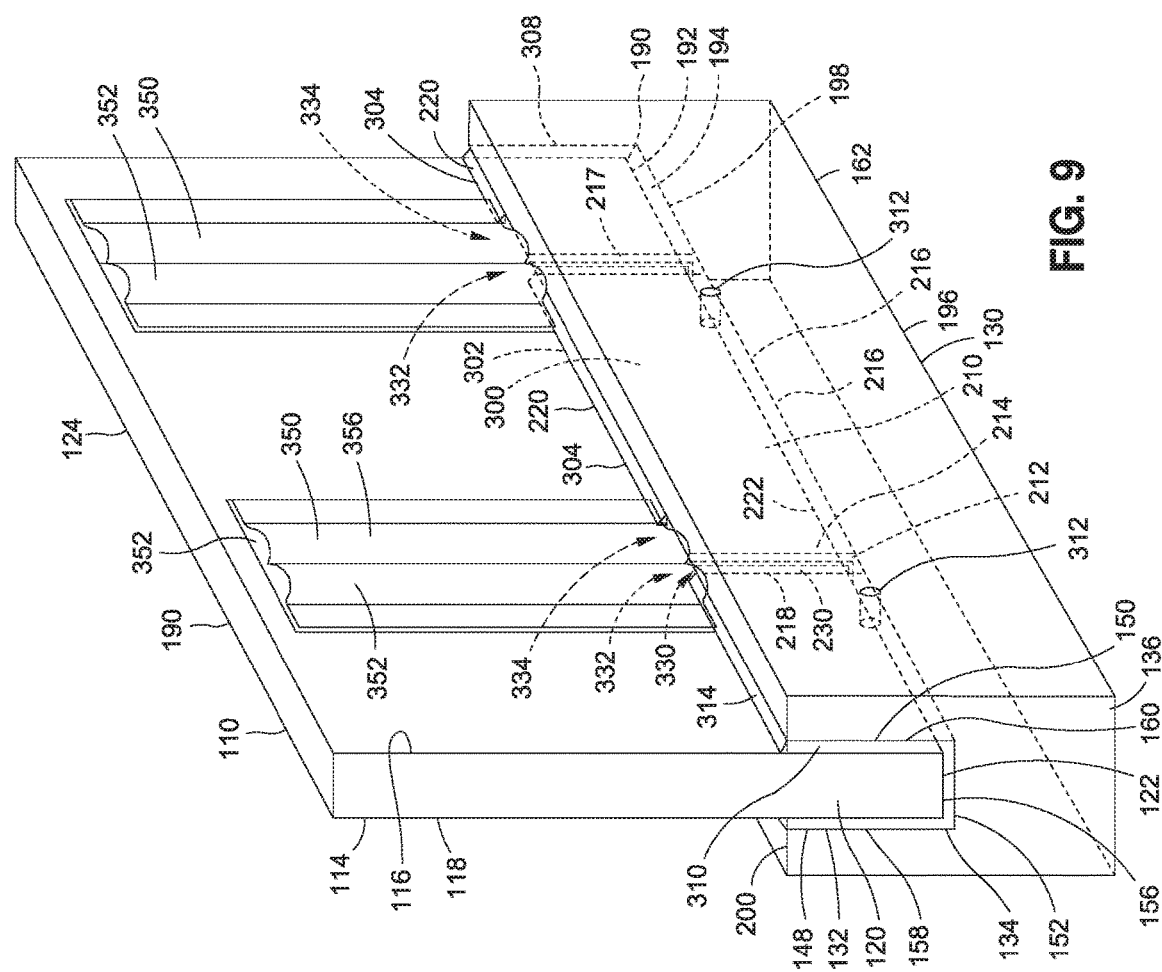
FIG. 9 is a perspective schematic illustration of the bonded joint of FIG. 7 showing adhesive reservoirs configured as vertical columns fluidly coupled to the bleed holes.
Figure 12:
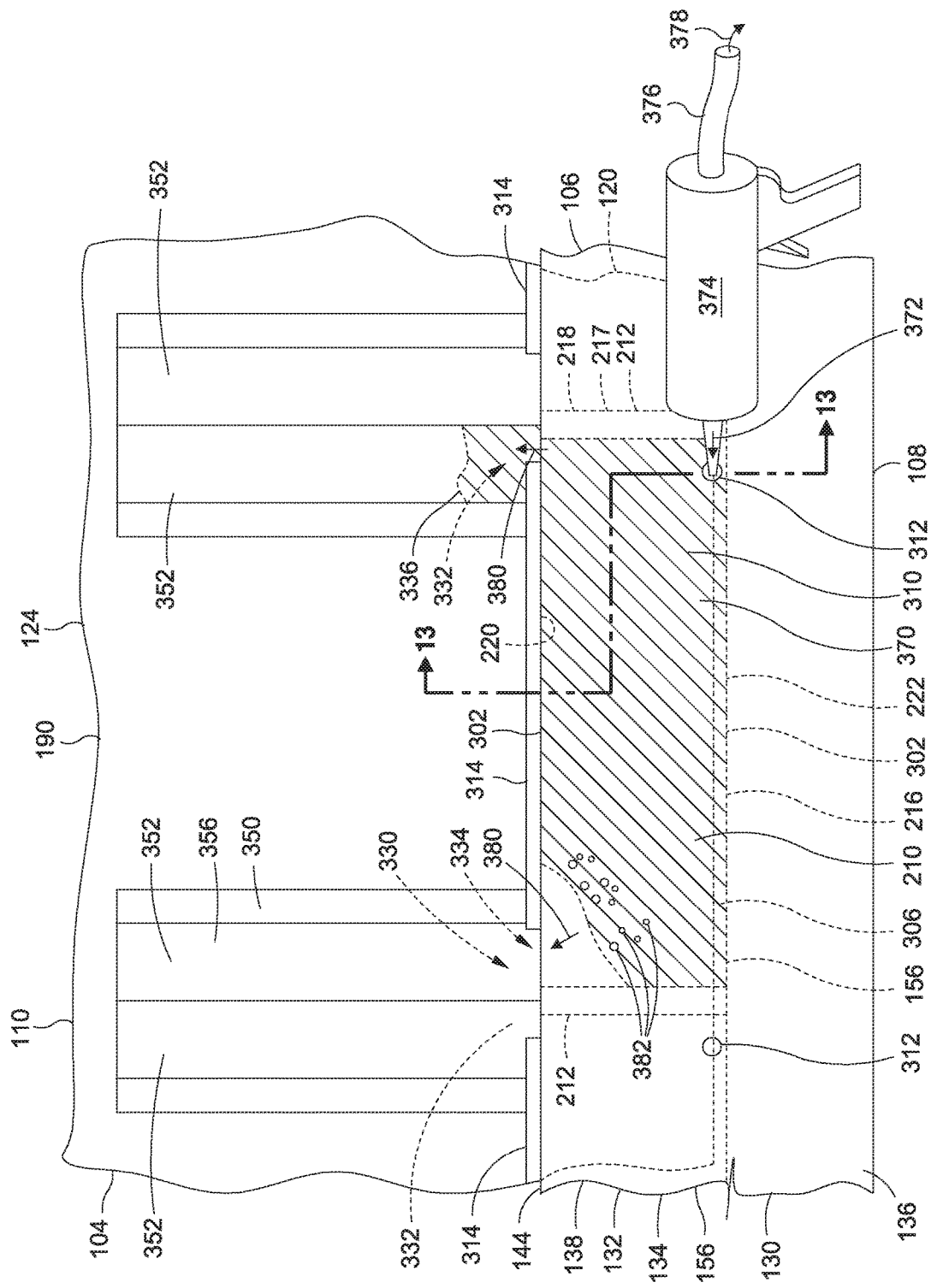
FIG. 12 is a side schematic illustration of the bonded joint of FIG. 11 and showing the flow of structural adhesive and air bubbles toward the large bleed hole and the discharge of excess adhesive resin through the small bleed hole and into the adhesive reservoir.

In FIG. 9, one or more of the adhesive reservoirs 350 may be formed as a vertical tube or vertical column 352 that may be fluidly coupled to a bleed hole 330. In an embodiment, each one of the vertical columns 352 may be releasably attached to the cylinder 110 such as by using adhesive tape (not shown). In an embodiment, the vertical columns 352 may be formed of non-silicone polymeric material (not shown) to avoid contamination of the structural adhesive 370 (FIG. 12). The material for forming the vertical columns 352 may be at least partially optically transparent material 356 to facilitate the observation of the flow of excess adhesive 336 (FIG. 12) into the vertical columns 352 during the discharge thereof from the bleed hole 330.

Figure 10:
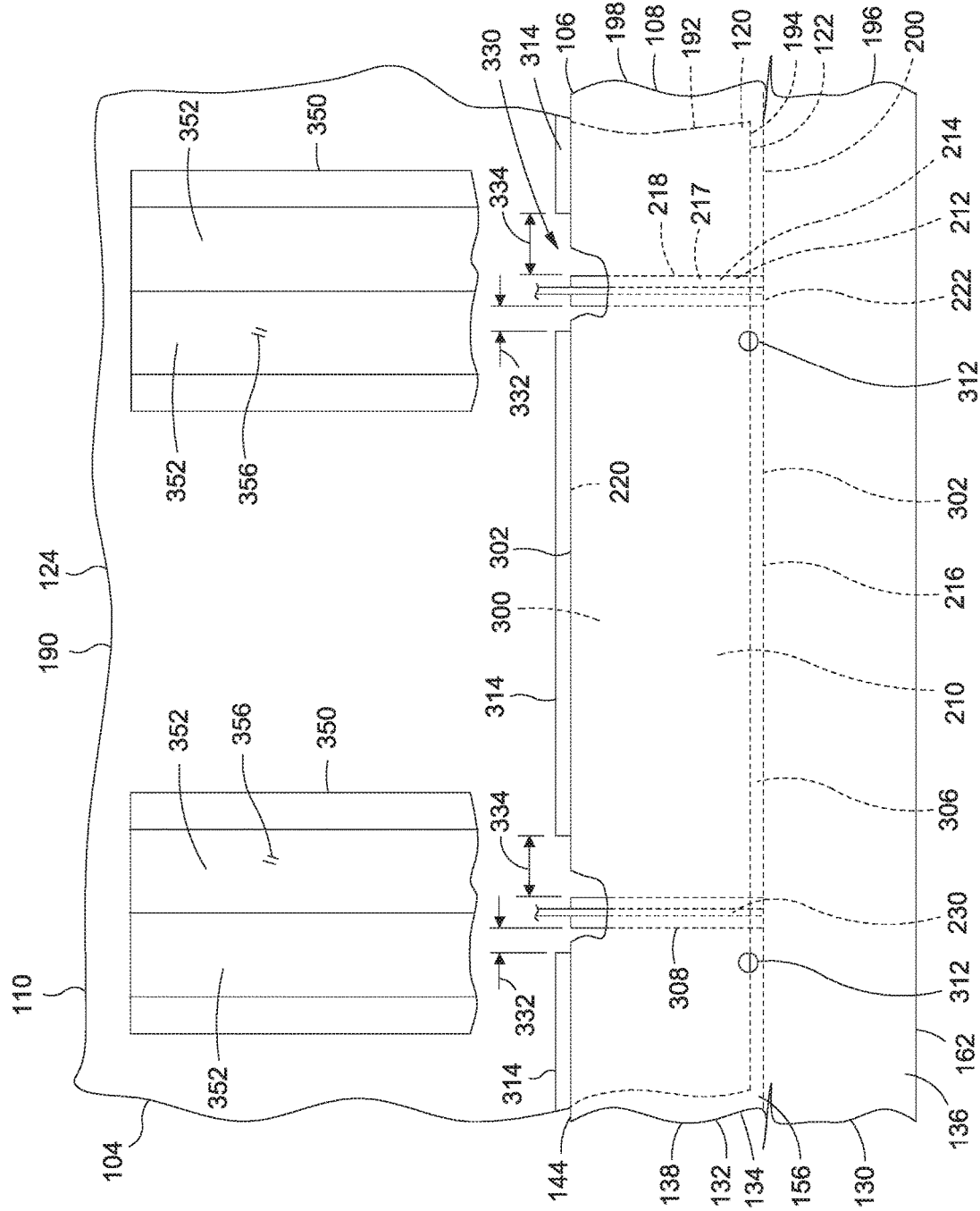
FIG. 10 is a side schematic illustration of the bonded joint of FIG. 9 in an embodiment having a large bleed and a small bleed hole positioned on opposite sides of the chamber walls.

FIG. 10 illustrates a large bleed hole 334 and a small bleed hole 332 located on opposite chamber ends 218 of each adhesive chamber 210. In an embodiment, the large bleed hole 334 may have a width in the range of from approximately 0.12-1.0 inch long or longer. For example, the large bleed hole may be approximately 0.50 inch long. The small bleed hole 332 may have a width in the range of from approximately 0.12-50 inch long or longer. For example, the small bleed hole 332 may be approximately 0.25 inch long. Each bleed hole 332, 334 may be located proximate a chamber wall 212. In addition, each bleed hole 332, 334 may be formed along a bondline dam 314 or at a terminal end of a bondline dam 314 along the upper channel edge 144 of the end ring 130.

In the embodiment shown in FIG. 10, an injection port 312 may be located proximate the chamber end 218 where the small bleed hole 332 may be located. The injection port 312 may be located proximate the lower edge 222 of the adhesive chamber 210 such as along the channel bottom surface 152 (FIG. 9). As described below, by locating the injection port 312 on the chamber end 218 having the small bleed hole 332, air bubbles 382 inside the adhesive chamber 210 may initially evacuate through the small bleed hole 332 and the large bleed hole 334 when structural adhesive 370 (FIG. 11) is initially injected into the adhesive chamber 210. After structural adhesive 370 starts to discharge through the small bleed hole 332, air bubbles 382 (FIG. 11) may continue to evacuate through the large bleed hole 334. In this regard, by positioning the injection port 312 proximate the chamber end 218 having the small bleed hole 332, air bubbles 382 may be evacuated along a substantial entirety of the chamber length 216 from one chamber end 218 to an opposite chamber end 218 and which may result in a reduced propensity for void formation or air bubble 382 (FIG. 11) entrapment along the upper bondline perimeter 302.

Referring to FIG. 11, Step 408 of the method 400 (FIG. 23) may include injecting the structural adhesive 370 into the adhesive chamber 210. FIG. 11 illustrates the flow direction 380 of the structural adhesive 370 and the air bubbles 382 within the adhesive chamber 210. The structural adhesive 370 may be injected under an injection pressure 372 by using an injection device 374 such as a sealant gun or adhesive gun or similar device coupled to an air pressure source 378 such as with an air hose 376. The structural adhesive 370 may be injected into the adhesive chamber 210 at an injection pressure 372 of between approximately 0.5-100 pounds per square inch (psi) or greater. For example, the structural adhesive 370 may be injected at an injection pressure 372 of between approximately 20-100 pounds per square inch (psi) such as approximately 50 psi. The selection of the injection pressure 372 may be dependent upon various parameters including, but not limited to, bondline thickness 310 (FIG. 3), cross-sectional configuration of the bonded joint 106 such as the C-channel 134 cross-sectional configuration (FIG. 13) versus a straight-line cross-sectional configuration (FIG. 21), viscosity and temperature of the structural adhesive 370, adhesive chamber 210 geometry and dimensions including chamber length 216, chamber width 217, bondline thickness 310, and other parameters.

In FIG. 11, in an embodiment, the structural adhesive 370 may initially comprise a liquid or semi-liquid material configured to be injected into the adhesive chambers 210. The structural adhesive 370 may comprise a one-part adhesive or a multi-part adhesive. In an embodiment, the structural adhesive 370 may comprise epoxy adhesive. The adhesive composition may be selected based on the material composition of the mating parts. The structural adhesive 370 may have a viscosity that facilitates injection into the adhesive chambers 210. The viscosity may be selected based on the bondline thickness 310 (FIG. 3) such that the structural adhesive 370 flows through the gaps 156, 158, 160 (FIG. 3) between the mating surfaces 192, 198 (FIG. 3) to substantially fill the adhesive chamber 210 in a manner that promotes the evacuation of air bubbles 382 and which minimizes or eliminates void formation. In an embodiment, the structural adhesive 370 may comprise a thixotropic material having an initially low viscosity to facilitate the flow of the structural adhesive 370 into the adhesive chamber 210 and through the relatively narrow bondline thickness 310 of the adhesive chamber 210. After injection, the structural adhesive 370 may increase in viscosity or thicken over time such as after the adhesive chambers 210 are filled and plugged and/or during curing of the structural adhesive 370.

In FIG. 12, Step 410 of the method 400 (FIG. 23) may include evacuating air bubbles 382 from the adhesive chamber 210 through one or more of the bleed holes 330 that may be fluidly coupled to the adhesive chamber 210. In FIG. 12, shown is the adhesive chamber 210 nearing a filled state 384 (FIG. 17) and illustrating the flow of the structural adhesive 370 and air bubbles 382 toward the large bleed hole 334. In FIG. 12, by locating the injection port 312 proximate a lower edge 222 of the adhesive chamber 210, air bubbles 382 will advantageously migrate upwardly toward the bleed holes 330. For embodiments having a small bleed hole 332 and a large bleed hole 334, the injection port 312 may advantageously be located underneath the small bleed hole 332 which may promote the evacuation of air bubbles 382 along the flow direction 380 from one chamber end 218 to an opposite chamber end 218 due to the tendency of air bubbles 382 to move along the path of least resistance presented by the large bleed hole 334.

In FIG. 12, Step 412 of the method 400 (FIG. 23) may include discharging excess adhesive 336 through one or more of the bleed holes 330. FIG. 12 shows the discharge of excess adhesive 336 through the small bleed hole 332 and into the adhesive reservoir 350 during the injection of the structural adhesive 370 into the adhesive chamber 210. The discharge of excess adhesive 336 may occur simultaneous with the evacuation of air bubbles 382 from the adhesive chamber 210. As indicated above, the bleed holes 330 may be formed at a bondline perimeter 302 such as along the bondline dam 314. Although not shown, one or more bleed holes 330 may also be formed in the first part 190 and/or in the second part 196 of a structural assembly 104 as an alternative to forming bleed holes 330 along a bondline dam 314.

Figure 13:
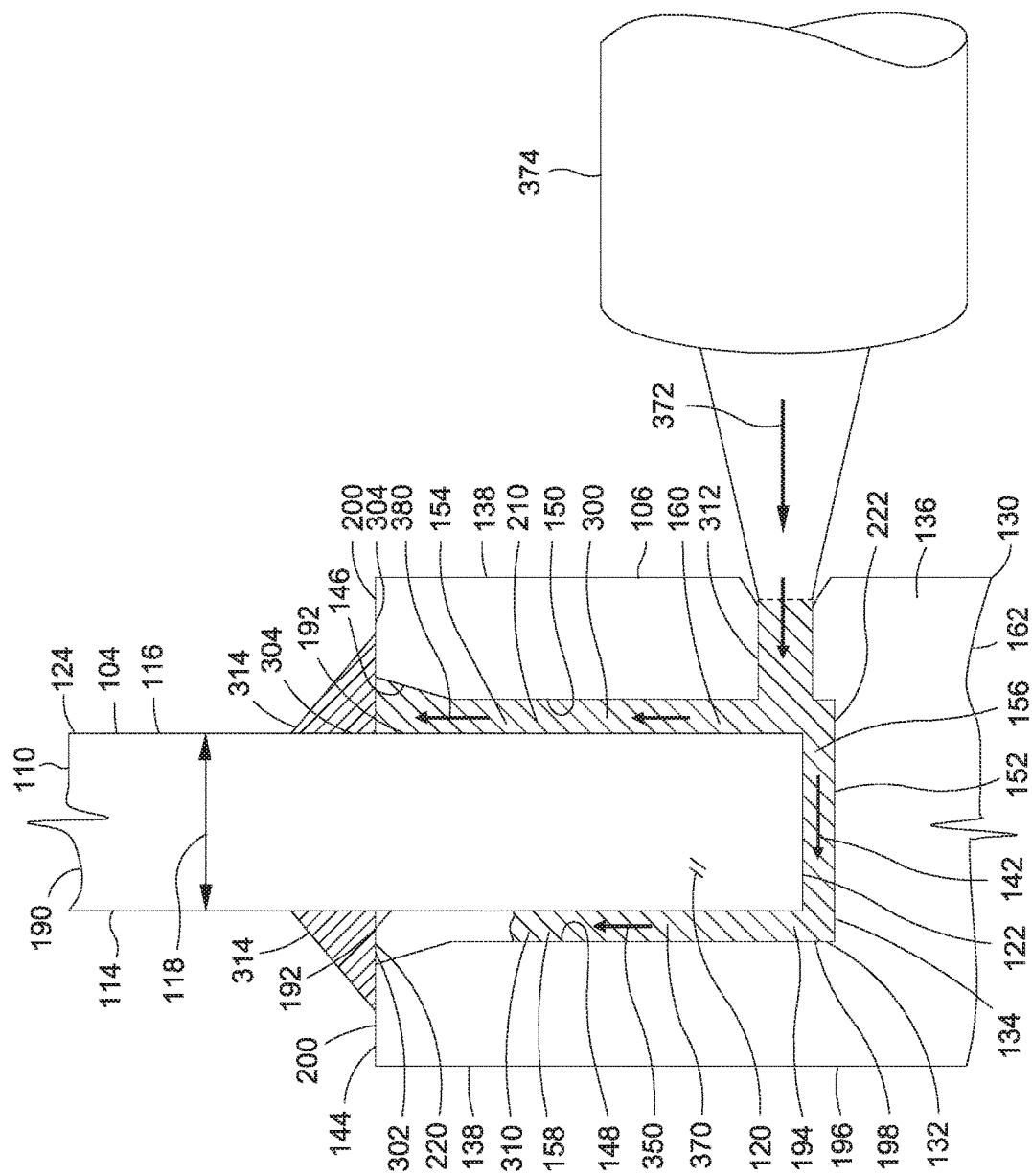
FIG. 13 is a cross-sectional illustration of the bonded joint taken along line 13 of FIG. 12 and showing the flow direction of structural adhesive through gaps between the cylinder edge and the C-channel.

In FIG. 13, shown is a cross-sectional view illustrating the injection of the structural adhesive 370 into the adhesive chamber 210 through an injection port 312. The injection port 312 may be countersunk for seating a nozzle (not shown) of the injection device 374. For the C-channel 134 configuration shown in FIG. 13, the structural adhesive 370 may be injected into an injection port 312 located on one side of the C-channel 134 such that the structural adhesive 370 flows along the indicated flow direction 380 upwardly along the cylinder outer surface 116 toward the bondline dam 314 at the channel edge 144. The structural adhesive 370 may also flow through the gap 154 between the channel bottom surface 152 and the cylinder edge 120 and then upwardly along the flow direction 380 into the gap 154 between the channel side surface 148 and the cylinder inner surface 114 on a side of the C-channel 134 opposite the injection port 312 and toward the bondline dam 314 wherein excess adhesive 336 may be discharged into one or more adhesive reservoirs located along the cylinder inner surface 114.

In FIG. 14, Step 414 of the method 400 (FIG. 23) may include collecting excess adhesive 336 with the adhesive reservoirs 350 that are fluidly coupled to the bleed holes 330. In FIG. 14, shown is an adhesive chamber 210 in a filled state 384 with excess adhesive 336 collected within the adhesive reservoirs 350. On an opposite side (not shown) of the cylinder 110, a similar set of bleed holes 330 and adhesive reservoirs 350 may be provided for collecting excess adhesive 336. In the bonded joint 106 of FIG. 14, the bleed holes 330 and the injection port 312 may be positioned such that the structural adhesive 370 flows upwardly toward the bondline dam 314 at the upper channel edge 144. The structural adhesive 370 remains at the upper channel edge 144 while the adhesive chamber 210 is filled allowing the structural adhesive 370 to flow along the upper channel edge 144 toward the bleed holes 330 and into the adhesive reservoirs 350 fluidly coupled to the adhesive chamber 210. The injection of structural adhesive 370 into the adhesive chamber 210 may continue until a predetermined amount of excess adhesive 336 is collected in each one of the adhesive reservoirs 350. During the injection of the structural adhesive 370, a technician may be stationed on each side (i.e., on the inner side and on the outer side) of the cylinder 110 to visually verify that each adhesive reservoir 350 contains excess adhesive 336 which may indicate that the adhesive chamber 210 is completely filled.

Figure 15:
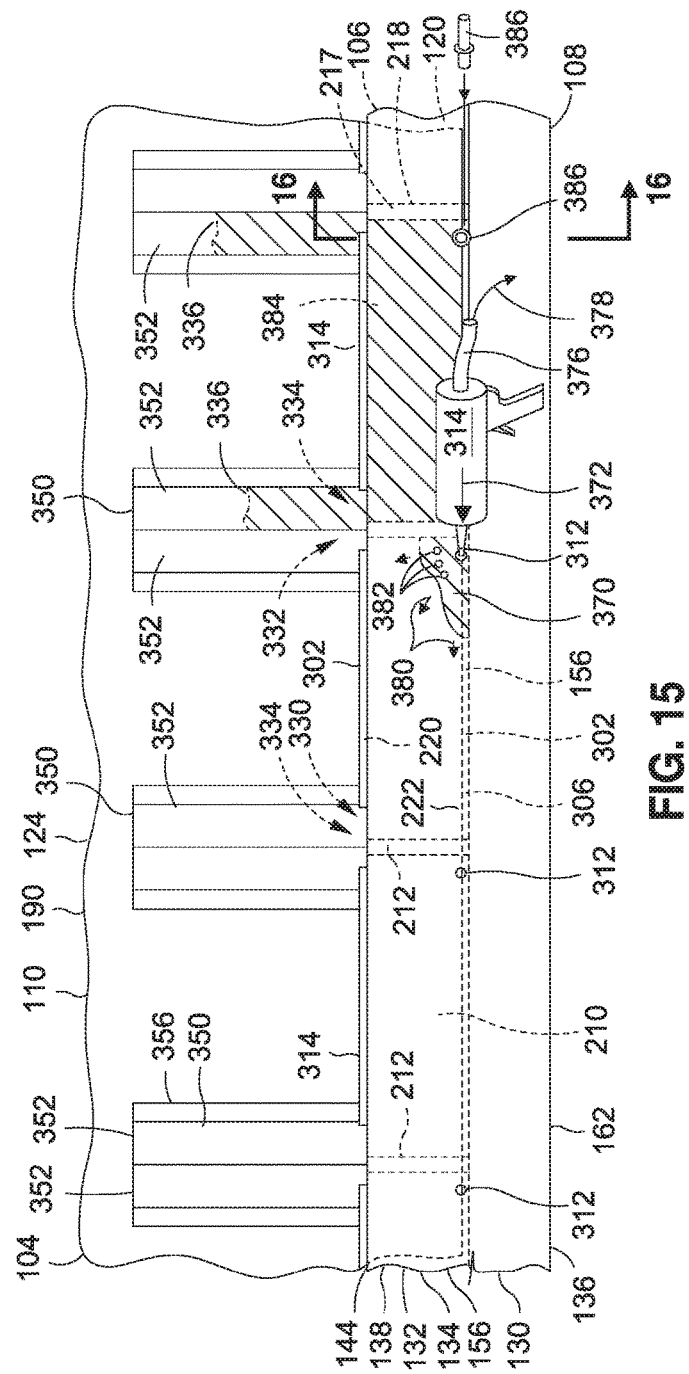
FIG. 15 is a side schematic illustration of the bonded joint of FIG. 14 and showing the injection of the structural adhesive into the plurality of adhesive chambers.

In FIG. 15, shown is the injection of the structural adhesive 370 into another adhesive chamber 210 located proximate a recently-filled adhesive chamber 210. In FIG. 15, the bonded joint 106 includes a series of the adhesive chambers 210 disposed along the bondline length 306. The series of adhesive chambers 210 may be filled in succession, or the adhesive chambers 210 may be filled in an alternative filling sequence. Structural adhesive 370 may be injected into each adhesive chamber 210 until the adhesive reservoirs 350 for each adhesive chamber 210 are filled. By filling the adhesive reservoirs 350 to a level that is above the level of the bleed holes 330, the adhesive reservoirs 350 may provide positive pressure to the adhesive chambers 210 to prevent the entrance of air into the adhesive chamber 210.

Figure 16:
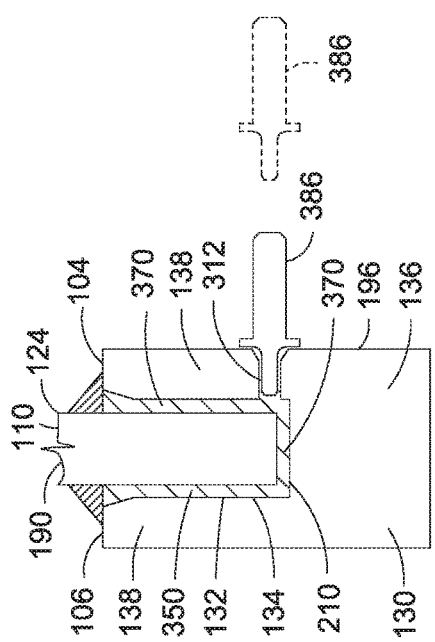
FIG. 16 is a cross-sectional illustration of the bonded joint taken along line 16 of FIG. 15 and illustrating a plug for plugging the injection port after filling the adhesive chamber with structural adhesive.

In FIG. 16, Step 416 of the method 400 (FIG. 23) may include plugging each injection port 312 with a plug 386 after filling the adhesive chamber 210 and removing the injection device 374 from the injection port 312. Adhesive residue (not shown) may be wiped from the exterior of the injection port 312 prior to installation of the plug 386. The plug 386 may trap the structural adhesive 370 within the adhesive chamber 210 and prevent the leakage of structural adhesive 370. The plug 386 may be sized and configured to provide a relatively tight fit with the injection port 312. The plug 386 may be formed of a metallic material or any other material that can be separated from the structural adhesive 370 and removed from the injection port 312 after the structural adhesive 370 is cured.

Figure 17:
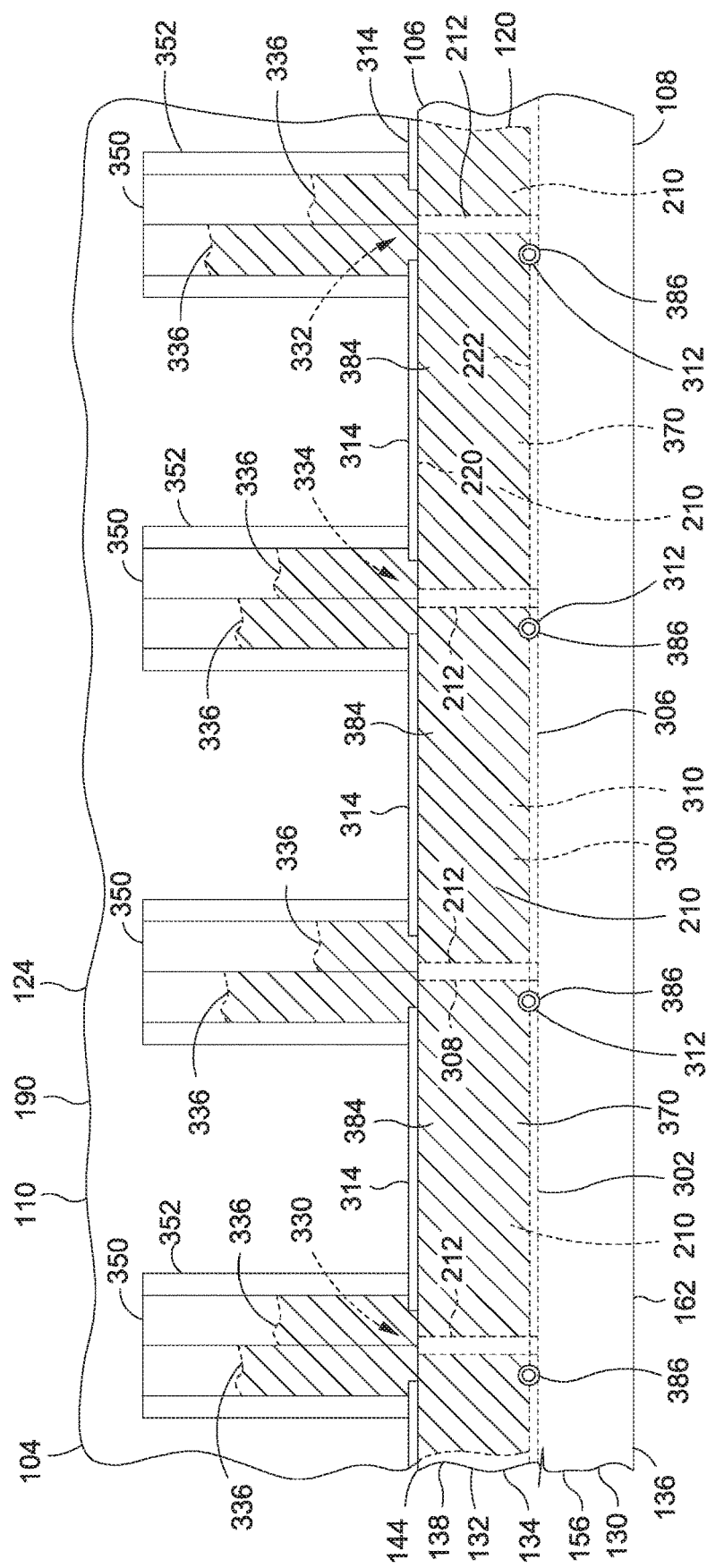
FIG. 17 is a side schematic illustration of the bonded joint of FIG. 15 and showing each one of the adhesive chambers filled with structural adhesive and further showing excess adhesive contained within the adhesive reservoirs.

In FIG. 17, shown is a portion of the bonded joint 106 between the cylinder 110 and the end ring 130 and illustrating each one of the adhesive chambers 210 filled with structural adhesive 370. Excess adhesive 336 is contained within each one of the adhesive reservoirs 350. Plugs 386 are shown installed in each one of the injection ports 312. As indicated earlier, the adhesive reservoirs 350 may be constructed of substantially optically transparent material to allow visual observation of the level of excess adhesive 336 as confirmation that the adhesive chambers 210 are filled.

Figure 18:
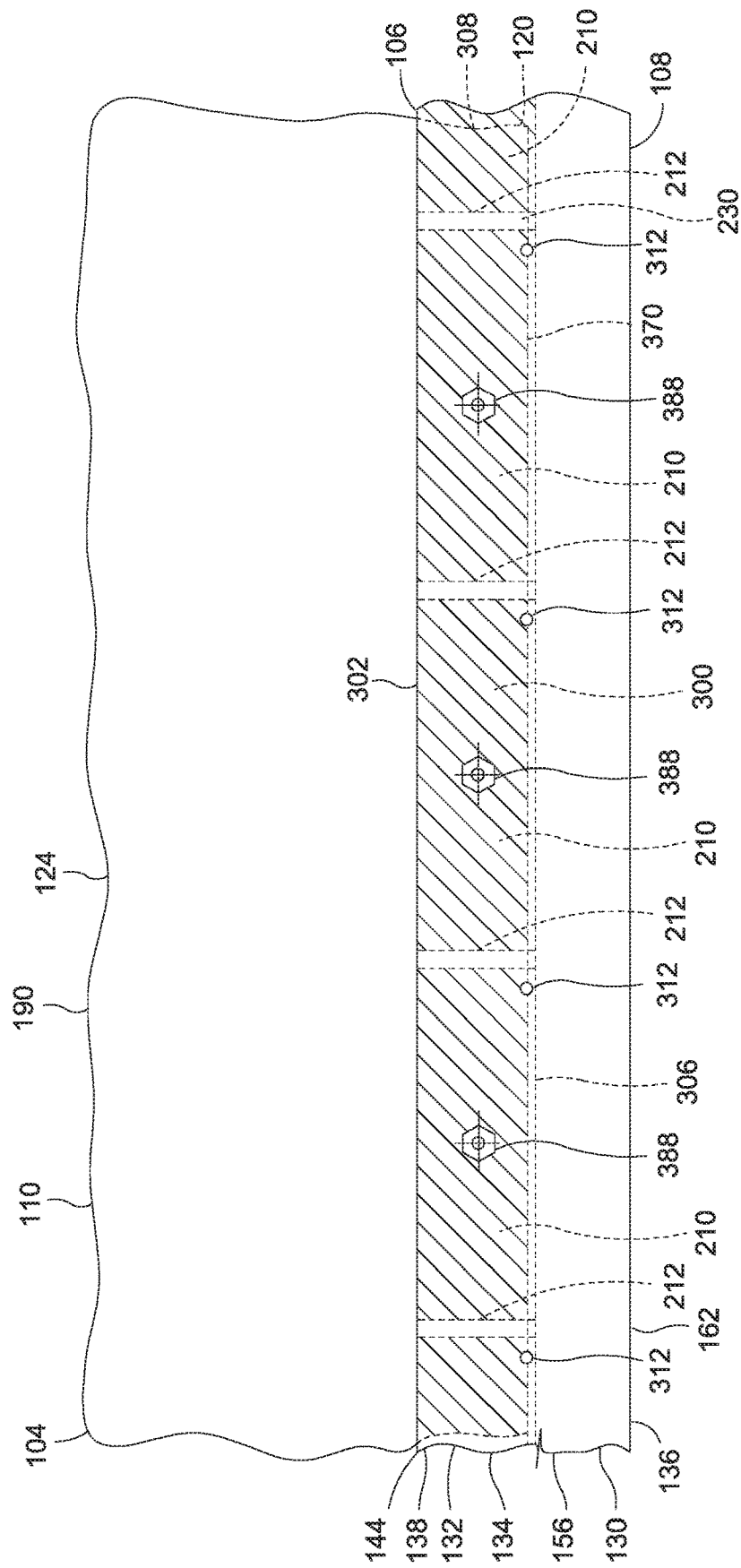
FIG. 18 is a side schematic illustration of the bonded joint of FIG. 17 in a final state following the removal of the adhesive reservoirs and the bondline dams, and further illustrating the optional installation of mechanical fasteners through each one of the adhesive chambers.

In FIG. 18, Step 418 of the method 400 (FIG. 23) may include allowing the structural adhesive 370 within the adhesive chamber 210 to cure for a predetermined period of time. Heat (not shown) may optionally be applied to the bonded joint 106 to facilitate the curing of the structural adhesive 370. Following the curing of the structural adhesive 370, the bondline dams 314 (FIG. 17) and the adhesive reservoirs 350 (FIG. 17) may be removed from the bonded joint 106. Protruding bond wires 230 may be trimmed. Adhesive residue (not shown) may be removed from the bonded joint 106. Optionally, one or more mechanical fasteners 388 may be installed as shown. For example, a mechanical fastener 388 may be installed through the adhesive chambers 210 to increase the strength of the bonded joint 106 and/or to prevent peeling forces between the cylinder 110 and the flanges 138 of the end ring 130.

Figure 19:
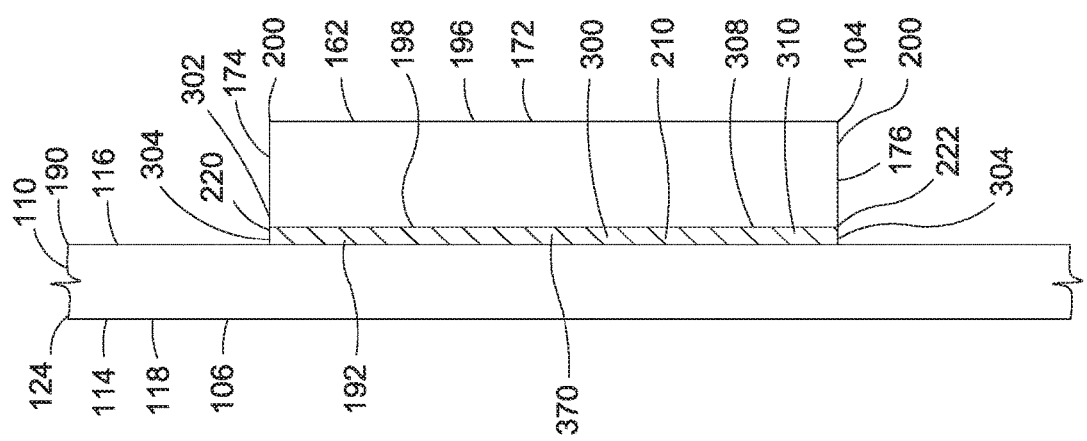
FIG. 19 is a cross-sectional illustration of the structural cylinder taken along line 19 of FIG. 2 and illustrating an embodiment of a bonded joint between an external ring and the cylinder.

In FIG. 19, shown is an embodiment of a bonded joint 106 between an external ring 172 and the cylinder 110 of the structural assembly 104 of FIG. 2. As indicated above, the cylinder 110 may be formed of a fiber-reinforced polymer matrix material 124 such as a carbon fiber epoxy material or other composite material. The external ring 172 may be formed of a metallic material 162 such as aluminum. The external ring 172 may have a ring upper edge 174 and a ring lower edge 176. The external ring 172 may be fixed in position relative to the cylinder 110 to provide a predetermined bondline thickness 310 around a cylinder circumference 112 (FIG. 2). The bondline thickness 310 may be established during a dry-fit operation similar to the dry-fit operation described above for the bonded joint 106 shown in FIG. 3.

In FIG. 19, the bondline thickness 310 between the external ring 172 and the cylinder 110 may be established using a series of bond wires 230 (FIG. 6) positioned around the cylinder circumference 112. The bond wires 230 may be positioned at predetermined spacings 224 (FIG. 2) from one another. Although not shown, such bond wires may have a generally straight configuration and may be installed in a manner similar to the bond wire 230 (FIG. 5) installation described above with regard to the C-channel 134 (FIG. 5) end ring 130 shown in FIG. 5. In FIG. 19, the cylinder 110 may be installed within the external ring 172 and the external ring 172 may be pinned in position relative to the cylinder 110. Shims (not shown) may be inserted into the bondline region 300 to shape each chamber wall 212 (FIG. 20) in a manner described above. The shims may be removed after forming the chamber walls 212 and prior to the injection of structural adhesive 370 into the adhesive chambers 210 (FIG. 20).

Figure 20:
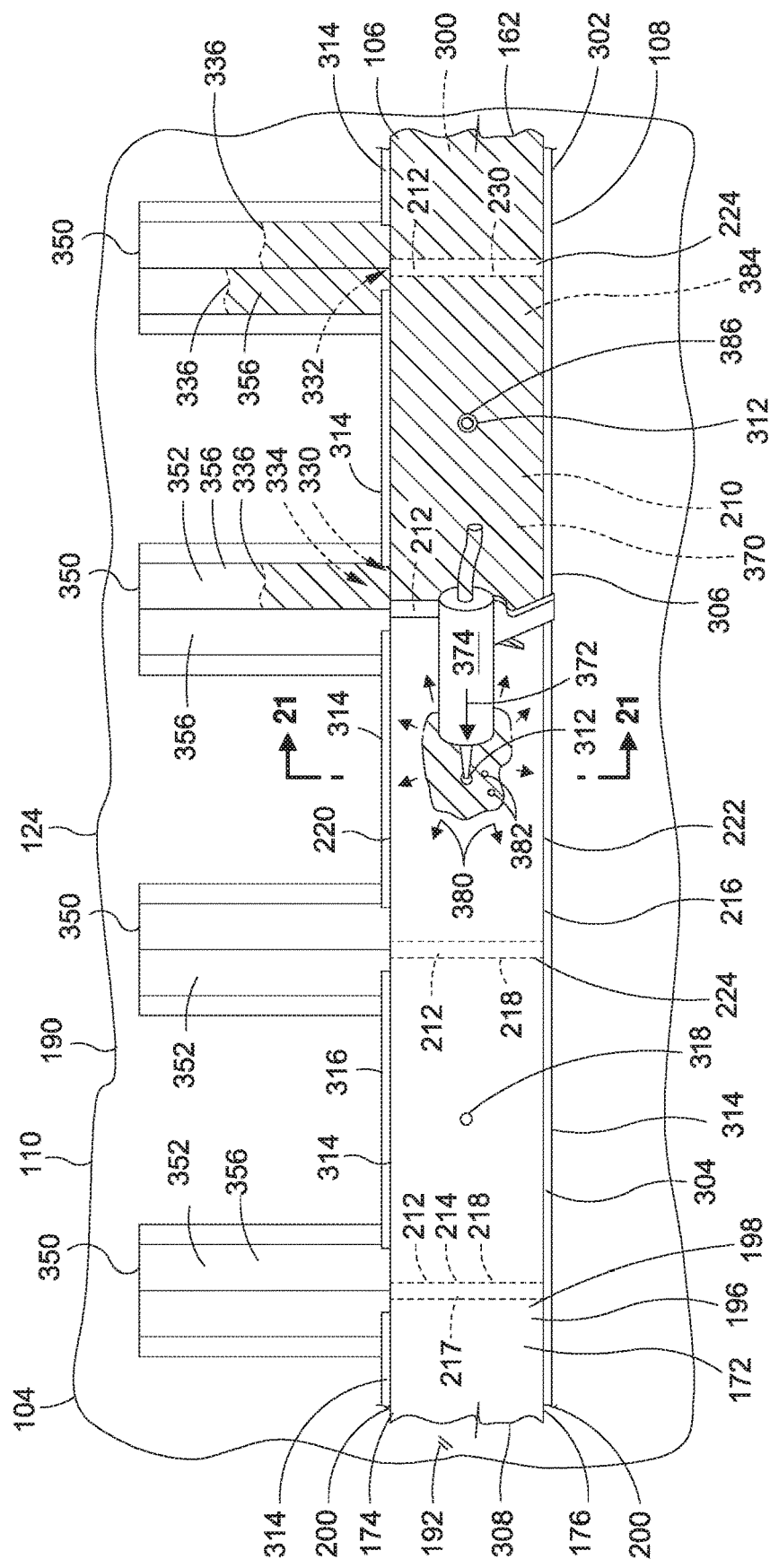
FIG. 20 is a flat pattern layout of the bonded joint of FIG. 19 illustrating the injection of structural adhesive into an injection port located at an approximate geometric center of the adhesive chamber.

In an alternative embodiment, in FIG. 19, the chamber walls 212 may be formed without the use of bond wires 230 (FIG. 20). For example, a pair of shims 238 (FIG. 6) may be inserted within the bondline region 300 to establish the gap 154 (FIG. 3) between the mating surfaces 192, 198. Adhesive 214 (FIG. 20) may be injected into the space between the shims 238 to form the chamber walls 214. The shims 238 may be moved toward one another in a manner as shown in FIG. 6 to shape the edges of the chamber walls 212 and to define a width of the chamber walls 212 and to seal the adhesive 214 against the mating surfaces 192, 198. The shims 238 may be removed from the bondline region 300 following the curing of the adhesive 214 of the chamber walls 212.

In FIG. 20, shown is a flat pattern layout of the bonded joint 106 of FIG. 19 during a bonding process wherein structural adhesive 370 may be injected into an injection port 312 of one of the adhesive chambers 210. The adhesive chambers 210 are separated from one another by the chamber walls 212. One or more adhesive reservoirs 350 may be formed to collect excess adhesive 336 from the adhesive chambers 210. The adhesive reservoirs 350 may be configured as vertical columns 352 as described above and may be formed of at least partially optically transparent non-silicone polymeric material 356 or other material that facilitates the observation of excess adhesive 336 discharging from the adhesive chambers 210. However, the adhesive reservoirs 350 may be provided in any one of a variety of alternative configurations for collecting excess adhesive 336 discharged from the bleed holes 330. For example, the adhesive reservoirs 350 may be formed as shelves 354 (FIG. 8).

Figure 21:
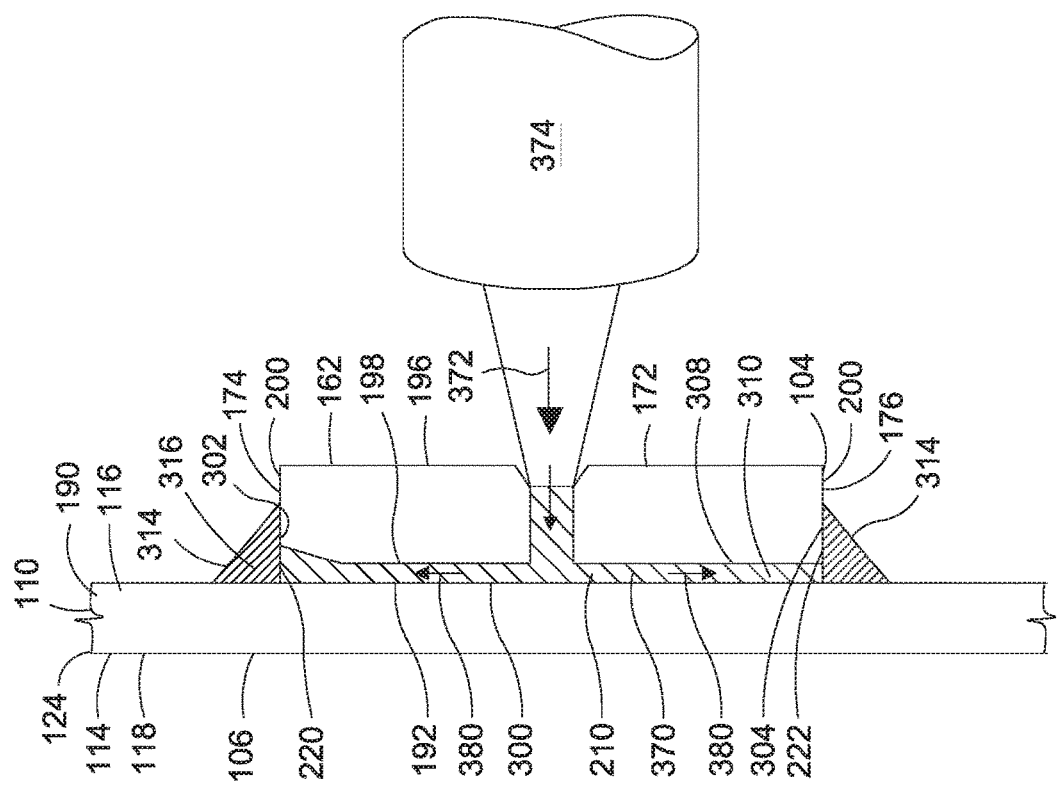
FIG. 21 is a cross-sectional illustration of the bonded joint taken along line 21 of FIG. 20 and illustrating the injection of structural adhesive into the adhesive chamber.

In FIG. 21, shown is a sectional view of the external ring 172 and cylinder 110 and illustrating the bondline dams 314 that may be formed along the ring upper edge 174 and/or the ring lower edge 176. The bondline dams 314 may define the bondline perimeter 302 enclosing the adhesive chamber 210. Bleed holes 330 (FIG. 20) may be formed along the ring upper edge 174 and/or ring lower edge 176 in a manner described above. An injection device 374 may be seated in the injection port 312 for injecting the structural adhesive 370 into the adhesive chamber 210.

In FIGS. 20-21, the injection ports 312 may be positioned approximately at a geometric center 318 (e.g., vertical center and/or horizontal center) of the adhesive chamber 210 to facilitate the uniform distribution and flow of the structural adhesive 370 from the injection port 312 toward the bondline perimeters 302. During the injection process, air bubbles 382 (FIG. 20) may evacuate from the adhesive chamber 210 through the bleed holes 330. Although the bleed holes 330 in FIG. 20 are shown as being located along the ring upper edge 174 for the vertically-oriented bondline region 300, it is contemplated that for arrangements where the bondline region 300 is generally horizontally-oriented (not shown), bleed holes 330 may be included on opposite edges of the external ring 172 such as along the same edges as the bondline dams 314 in FIG. 21.

Figure 22:
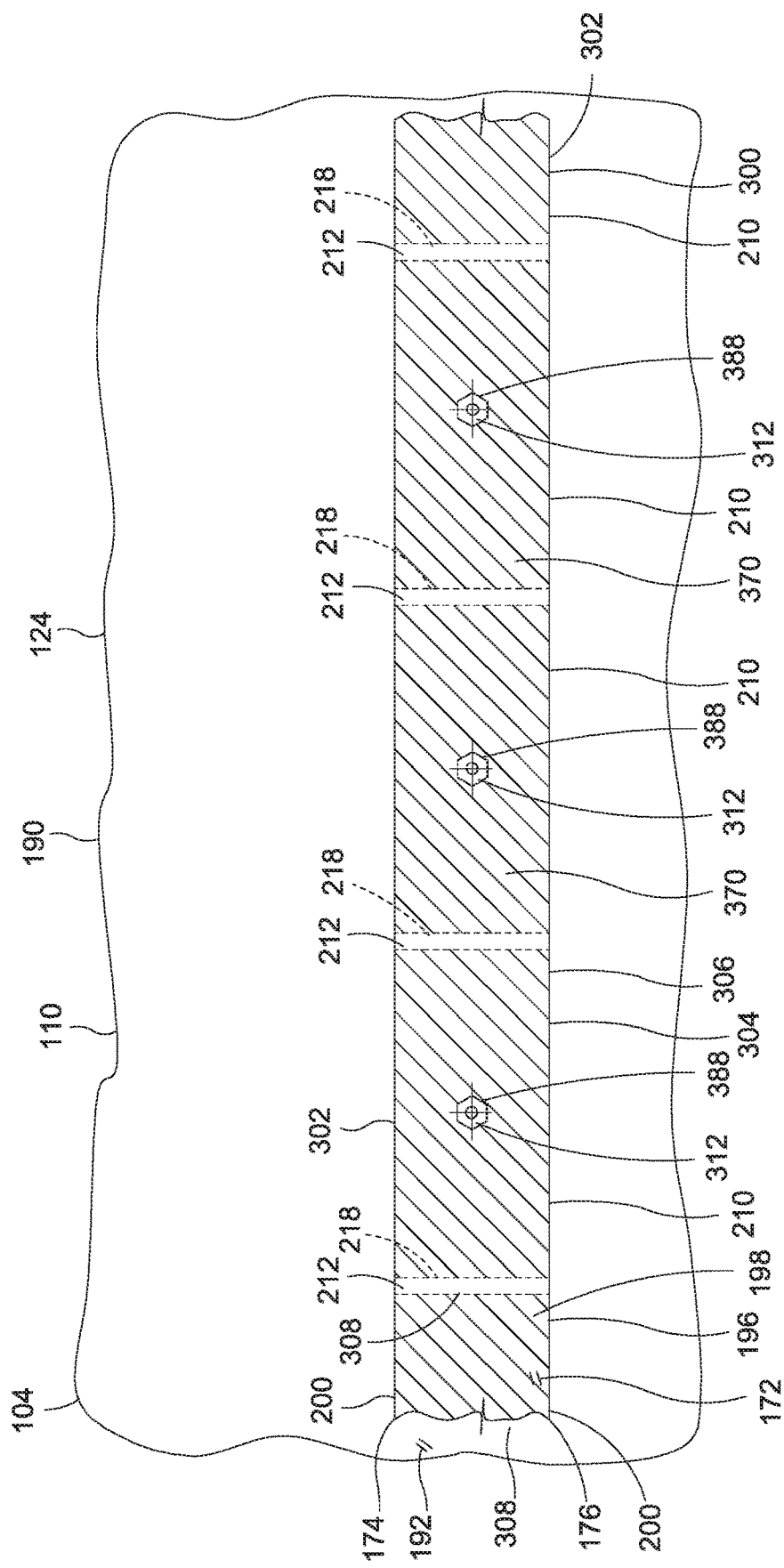
FIG. 22 is a side schematic illustration of the bonded joint of FIG. 20 in a final state following the removal of the adhesive reservoirs and the bondline dams, and further illustrating the optional installation of mechanical fasteners through each one of the adhesive chambers.
Figure 23:
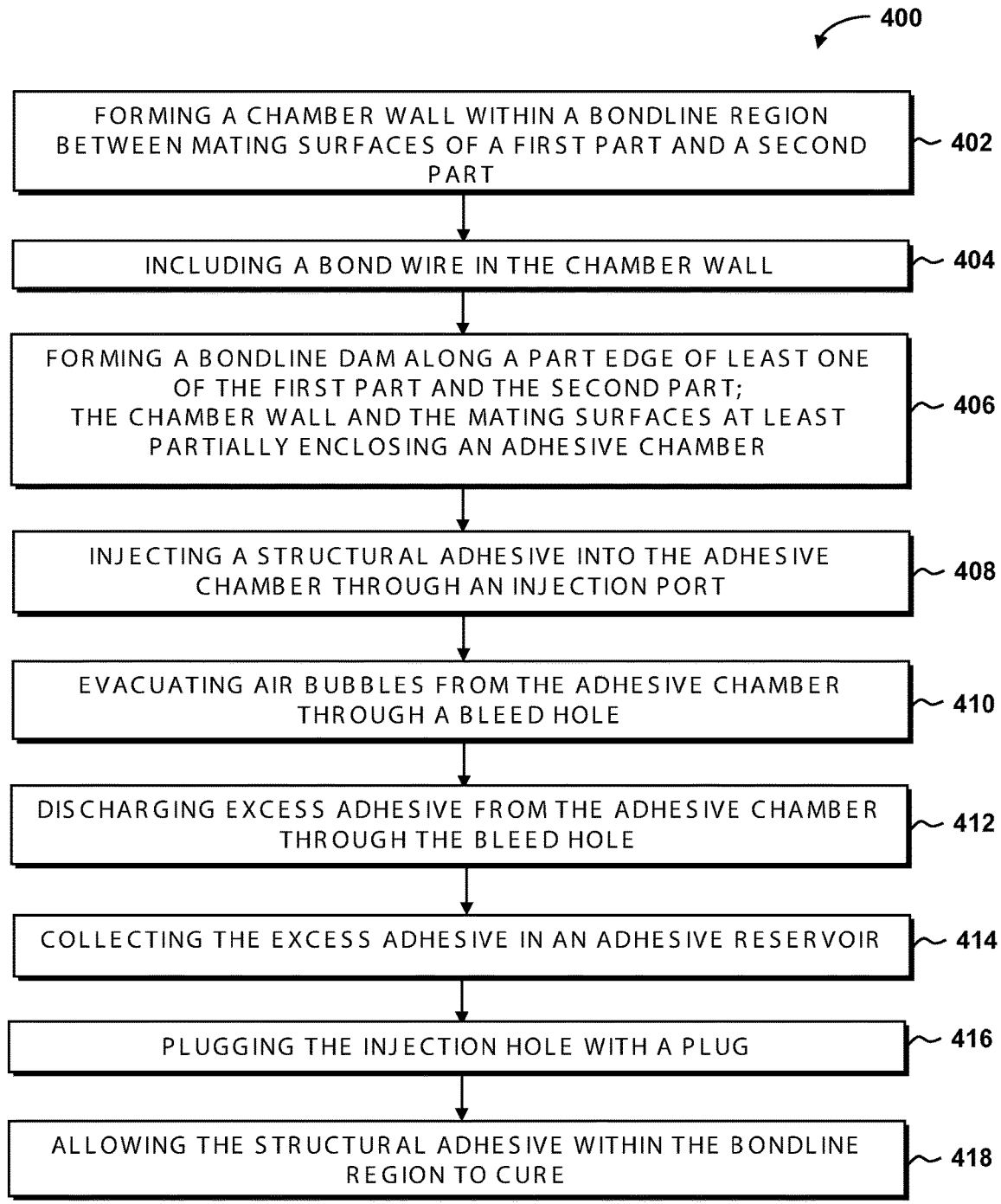
FIG. 23 is an illustration of a flow chart of a method of forming an injection-bonded joint.

In FIG. 22, shown is the bonded joint 106 of FIG. 20 in a final state following the curing of the structural adhesive 370 in the adhesive chambers 210 and the removal of the adhesive reservoirs 350 (FIG. 20), the bondline dams 314, and plugs (not shown). Also shown is the optional installation of mechanical fasteners 388 such as threaded fasteners (e.g., bolts, Hi-loks™, rivets, etc.) through each one of the adhesive chambers 210 to increase the strength of the bonded joint 106 and/or to minimize peeling forces. The process of bonding an internal ring 170 (FIG. 2) to the cylinder 110 may be performed in a manner similar to the above-described process of bonding the external ring 172 to the cylinder 110.

Figure 24:
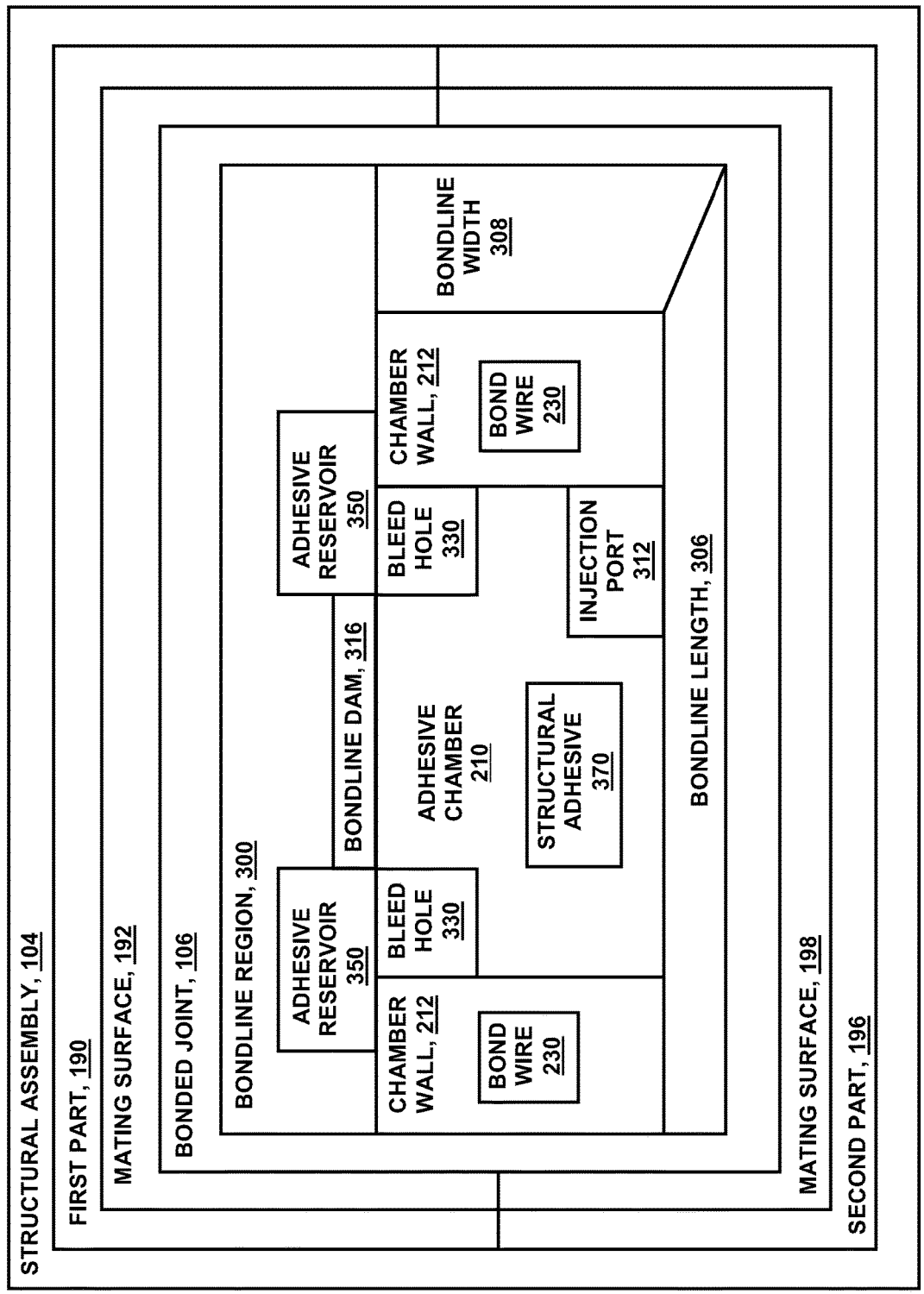
FIG. 24 is a block diagram of a bonded joint.

FIG. 24 is a block diagram of a bonded joint 106 illustrating the mating surface 192 of a first part 190 bonded to the mating surface 198 of a second part 196. The first part 190 and the second part 196 may collectively form the structural assembly 104. The mating surfaces 192, 198 may be bonded together along a bondline region 300 having a bondline length 306 and a bondline width 308. In an embodiment, the bonded joint 106 may comprise a long length geometry feature 108 (FIG. 2). For example, the bondline length 306 may be at least twice as long as the bondline width 308.

In FIG. 24, in an embodiment, the first part 190 and the second part 196 may define a substantially straight, planar bondline region 300 as is schematically shown in FIG. 5, and are not limited to a curved panel or a cylinder 110 bonded to a ring such as an end ring 130 or internal or external ring 170, 172 as shown in FIG. 2. In this regard, the first part 190 and the second part 196 may define a relatively long, straight, generally planar bondline region 300 having a generally straight-line cross-sectional configuration (e.g., FIG. 21). The bondline length 306 may be twice the bondline width 308 or larger. For example, the bondline length 306 of such straight, planar bondline region 3600 may be three (3) or more times the bondline width 308 or longer.

In FIG. 24, the bondline length 306 may be divided by a series of chamber walls 212 that may be formed within the bondline region 300 between the mating surface 192 of the first part 190 and the mating surface 198 of the second part 196. In an embodiment, the chamber walls 212 may be oriented generally transverse to the bondline length 306 although other orientations of the chamber walls 212 are contemplated. One or more of the chamber walls 212 may include a bond wire 230 for setting a gap (not shown) between the mating surfaces 192, 198. At least one bondline dam 314 (FIG. 17) may be formed along a part edge 194, 200 (FIG. 13) of least one of the first part 190 and the second part 196 to define at least a portion of the bondline perimeter 302 (FIG. 17). The chamber wall(s) 212, the bondline dam(s) 314, and the mating surfaces 192, 198 may collectively enclose the adhesive chamber(s) 210.

In FIG. 24, one or more bleed holes 330 may be formed along the bondline dam 314 (FIG. 17) or along other locations of the bondline region 300. The bleed hole(s) 330 may allow for the discharge of excess adhesive 336 (FIG. 12) from the adhesive chambers 210. One or more adhesive reservoirs 350 may be fluidly coupled to the bleed holes 330 to collect excess adhesive 336 discharged from the adhesive chambers 210 during injection of structural adhesive 370 into the adhesive chambers 210. The structural adhesive 370 may be injected into the adhesive chamber 210 through an injection port 312 after the adhesive chamber 210 is sealed and/or enclosed along the chamber walls 212 and the bondline dams 314.

Figure 25:
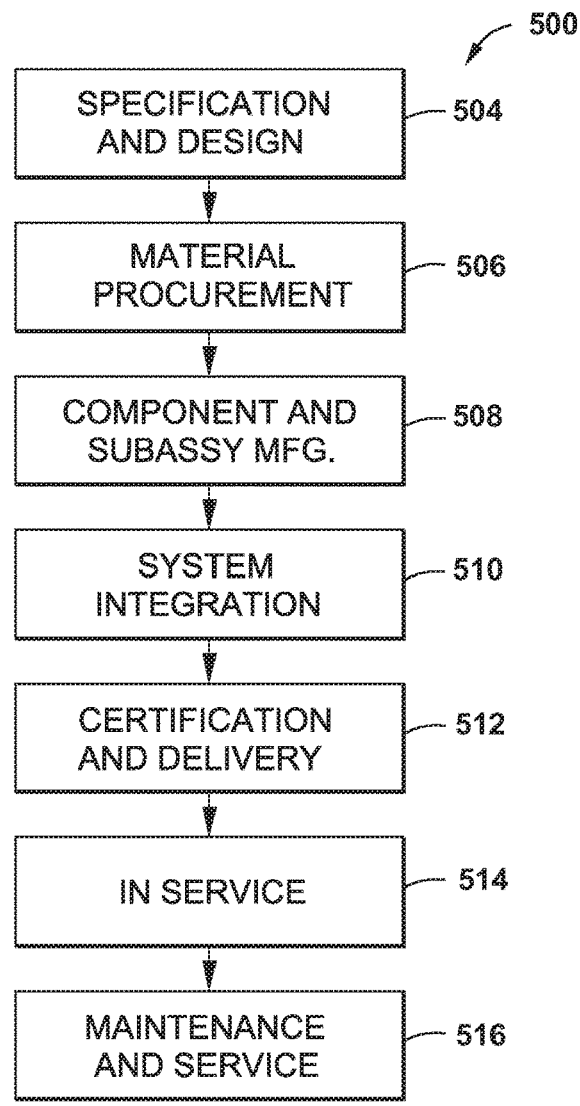
FIG. 25 is a flow diagram illustrating an aircraft manufacturing and service methodology.
Figure 26:
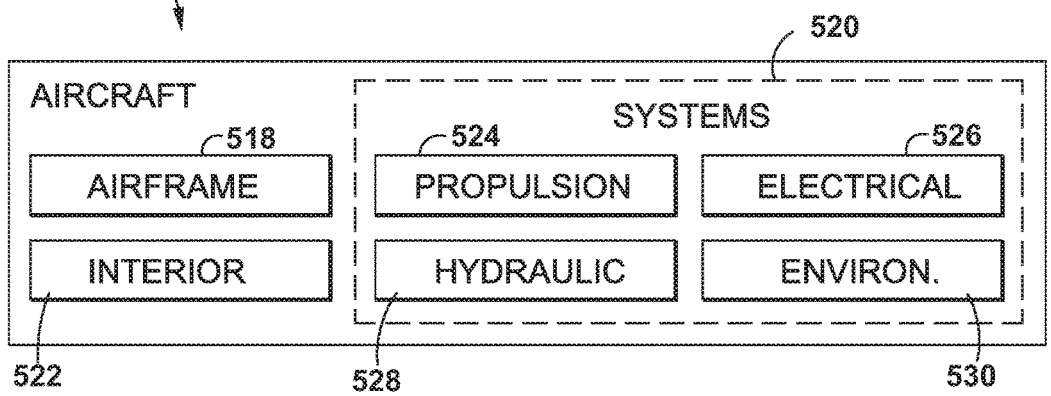
FIG. 26 is a block diagram of an aircraft.

Referring to FIGS. 25-26, embodiments of the disclosure may be described in the context of an aircraft manufacturing and service method 500 as shown in FIG. 25 and an aircraft 502 as shown in FIG. 26. During pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 26, the aircraft 502 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the principles of the invention may be applied to other industries, such as the automotive industry.

Apparatus and methods embodied herein may be employed during any one or more of the stages of the production and service method 500. For example, components or subassemblies corresponding to production process 508 may be fabricated or manufactured in a manner similar to components or subassemblies produced while the aircraft 502 is in service. Also, one or more apparatus embodiments, method embodiments, or a combination thereof may be utilized during the production stages 508 and 510, for example, by substantially expediting assembly of or reducing the cost of an aircraft 502. Similarly, one or more of apparatus embodiments, method embodiments, or a combination thereof may be utilized while the aircraft 502 is in service, for example and without limitation, to maintenance and service 516.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of forming an injection-bonded joint, comprising the steps of:
   providing a first part having opposing inner and outer surfaces, and a second part having opposing inner and outer surfaces, a second part upper edge and a second part lower edge;
   disposing a respective one of the inner and outer surfaces of the second part parallel or concentric to a corresponding respective one of the inner and outer surfaces of the first part;
   forming a chamber wall within a bondline region between mating opposing inner and outer surfaces of the first part and the second part, the chamber wall dividing a bondline length of the bondline region and defining at least one adhesive chamber;
   forming a bondline dam along each of the second part upper edge and the second part lower edge in a manner such that the chamber wall, the bondline dams, and the mating surfaces collectively enclose the adhesive chamber having a chamber upper edge and a chamber lower edge;
   injecting a structural adhesive into each adhesive chamber through an injection port formed in the second part;
   discharging excess structural adhesive from each adhesive chamber through a bleed hole located between the first and second parts and formed within the bondline dam of the adhesive chamber along the second part upper edge; and
   collecting the excess structural adhesive in an adhesive reservoir fluidly coupled to each bleed hole, each adhesive reservoir being formed as one of a vertical column comprising a longitudinally-extending channel attached to the respective inner or outer surface of the first part, and a shelf attached to the corresponding respective inner or outer surface of the second part and projecting therefrom, adjacent the second part upper edge.

2. The method of claim 1, wherein:
   the first part and the second part define a substantially straight, planar bondline region.

3. The method of claim 1, wherein:
   the first part comprises a cylinder;
   the second part comprises one of an internal ring and an external ring; and
   the first part and the second part define a circular bondline region.

4. The method of claim 1, wherein the step of forming the chamber wall comprises:
   forming the chamber wall from adhesive.

5. The method of claim 1, wherein the step of forming the chamber wall comprises:
   attaching a series of bond wires along a surface of the first part;
   coating the bond wires with adhesive; and
   positioning the second part relative to the first part such that the bond wires are captured with the bondline region, forming a series of adhesive chambers along the bondline length.

6. The method of claim 1, wherein the bondline length is at least twice a bondline width.

7. A structural assembly, comprising:
   a first part having opposing inner and outer surfaces and a second part having opposing inner and outer surfaces, a second part upper edge and a second part lower edge, a respective one of the inner and outer surfaces of the second part being disposed parallel or concentric to a corresponding respective one of the inner and outer surfaces of the first part, and opposing mating surfaces of the first part and the second part being adhesively bonded together along a bondline region having a bondline length;
   a series of chamber walls formed along the bondline length and dividing the bondline length into a plurality of adhesive chambers;
   a bondline dam formed along each of the second part upper edge and the second part lower edge in a manner such that the chamber walls, the bondline dams, and the mating surfaces collectively enclose the adhesive chambers;
   a structural adhesive injected into each of the adhesive chambers through an injection port formed in the second part and bonding the first part to the second part, and excess structural adhesive being discharged from each adhesive chamber through a bleed hole located between the first and second parts and formed within the bondline dam of the adhesive chamber along the second part upper edge; and
   a plurality of adhesive reservoirs, each fluidly coupled to a respective one of the bleed holes for collecting the excess structural adhesive, each adhesive reservoir being formed as one of a vertical column comprising a longitudinally-extending channel attached to the respective inner or outer surface of the first part, and a shelf attached to the corresponding respective inner or outer surface of the second part and projecting therefrom, adjacent the second part upper edge.

8. The structural assembly of claim 7, wherein:
the first part and the second part define a substantially straight, planar bondline region.

9. The structural assembly of claim 7, wherein:
the first part comprises a cylinder;
the second part comprises one of an internal ring and an external ring;
the first part and the second part define a circular bondline region; and
the series of chamber walls being distributed around a cylinder circumference and bonding the cylinder to the one of the internal ring and the external ring.

10. The structural assembly of claim 7, wherein:
the chamber walls are oriented generally transverse to the bondline length.

11. The structural assembly of claim 7, further comprising:
a bond wire included with at least one of the chamber walls.

12. The structural assembly of claim 11, wherein:
the bond wire defines a bondline thickness between the mating surfaces.

13. The structural assembly of claim 7, wherein:
the structural adhesive comprises an epoxy adhesive.

14. The structural assembly of claim 7, further comprising:
at least one mechanical fastener extending through the first part and the second part in the bondline region.

15. The structural assembly of claim 7, wherein:
the first part is formed of fiber-reinforced polymer matrix material; and
the second part is formed of metallic material.

16. The structural assembly of claim 7, wherein the bondline length is at least twice a bondline width.

* * * * *